(12) United States Patent
Pieczul et al.

(10) Patent No.: US 12,386,974 B2
(45) Date of Patent: Aug. 12, 2025

(54) THREAT CHANGE ANALYSIS SYSTEM

(71) Applicant: Oracle International Corporation, Redwood Shores, CA (US)

(72) Inventors: Olgierd Stanislaw Pieczul, Dublin (IE); Anusha Gururaja Manur, Seattle, WA (US); Tasneem Singh, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 109 days.

(21) Appl. No.: 17/891,398

(22) Filed: Aug. 19, 2022

(65) Prior Publication Data
US 2024/0061939 A1     Feb. 22, 2024

(51) Int. Cl.
*G06F 21/00*     (2013.01)
*G06F 21/57*     (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
USPC ........................................................ 726/22–25
See application file for complete search history.

(56) References Cited

U.S. PATENT DOCUMENTS

| | | | |
|---|---|---|---|
| 11,546,360 B2 * | 1/2023 | Woodford | G06F 21/556 |
| 11,750,642 B1 * | 9/2023 | Tautschnig | H04L 63/1441 |
| 2008/0148398 A1 * | 6/2008 | Mezack | G06F 21/552 726/22 |
| 2011/0302657 A1 * | 12/2011 | Ikegami | G06F 21/577 726/25 |
| 2020/0364342 A1 * | 11/2020 | Martinez | G06F 21/575 |
| 2023/0177165 A1 * | 6/2023 | Underwood | G06F 21/577 726/25 |
| 2023/0252158 A1 * | 8/2023 | Bishop, III | G06F 21/577 726/25 |
| 2023/0385889 A1 * | 11/2023 | Ali | G06Q 30/0609 |

* cited by examiner

*Primary Examiner* — Bharat Barot
(74) *Attorney, Agent, or Firm* — Kilpatrick Townsend & Stockton LLP

(57) ABSTRACT

A system for analyzing security threat changes of proposed changes to an infrastructure environment. For example, system and approaches for determining actions to be performed based on security threat changes corresponding to proposed changes to the infrastructure environment is disclosed.

20 Claims, 13 Drawing Sheets

THREAT CHANGE ANALYSIS SYSTEM

BACKGROUND

A cloud service provider (CSP) provides a variety of services to users or customers on demand using different systems and infrastructure services. The CSP provides infrastructure services that can be used to build networks and deploy resources. Once established, users may request changes to be made to the infrastructure and/or the infrastructure services of the CSP. Changes to the infrastructure and/or infrastructure services may introduce and/or mitigate security threats of the CSP.

In legacy approaches, the user requesting the change and/or another individual would analyze the changes to determine the effect on the security of the CSP. In particular, the user and/or the other individual would evaluate the change to determine security threat changes that could be caused by the changes. The user and/or other individual may determine whether to allow the changes based on the security threat changes. In legacy systems, the speed at which updates could or would be implemented could allow time for the user and/or individual to determine the security threat changes and determine whether to allow the changes based on the security threat changes.

As the technology of infrastructure and/or infrastructure services have advanced, the speed at which changes to the infrastructure and/or the infrastructure services can be implemented has increased. The increased speed can allow for the changes to be made reactive to demand or other changing circumstances. This increased speed at which the services can be implemented can cause the manual security threat review and change approval to be the limiting factor in the speed which changes can be implemented.

SUMMARY

The present disclosure relates generally to a framework for transferring workloads and/or other data between classified regions. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to one or more non-transitory, computer-readable media having instructions stored thereon, wherein the instructions, when executed by a system, may cause the system to perform processing including receiving a change to be applied to an infrastructure environment for supporting a set of services, and generating a change threat model for the infrastructure environment based upon the change to be applied, the change threat model indicative of a new security state for the infrastructure environment upon applying the change. The processing may further include comparing the change threat model with a current threat model for an existing state of the infrastructure environment, the current threat model indicative of a current security state for the existing state of the infrastructure environment, identifying a security change in a security state of the infrastructure environment based at least in part on the comparison, and responsive to identifying the security change in the security state, determining whether an action is to be performed with respect to the security change.

An aspect of the present disclosure is directed to a method that may include receiving, by a system, a change to be applied to an infrastructure environment for supporting a set of services, and generating, by the system, a change threat model for the infrastructure environment based upon the change to be applied, the change threat model indicative of a new security state for the infrastructure environment upon applying the change. The method may further include comparing, by the system, the change threat model with a current threat model for an existing state of the infrastructure environment, the current threat model indicative of a current security state for the existing state of the infrastructure environment, identifying, by the system, a security change in a security state of the infrastructure environment based at least in part on the comparison, and responsive to identifying the security change in the security state, determining, by the system, whether an action is to be performed with respect to the security change.

An aspect of the present disclosure is directed to a threat analysis system, which may include a memory to store a current threat model for an existing state of an infrastructure environment, and a processor coupled to the memory. The processor may receive a change to be applied to an infrastructure environment for supporting a set of services, and generate a change threat model for the infrastructure environment based upon the change to be applied, the change threat model indicative of a new security state for the infrastructure environment upon applying the change. The processor may further compare the change threat model with a current threat model for an existing state of the infrastructure environment, the current threat model indicative of a current security state for the existing state of the infrastructure environment, identify a security change in a security state of the infrastructure environment based at least in part on the comparison, and responsive to identification of the security change in the security state, determine whether an action is to be performed with respect to the security change.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
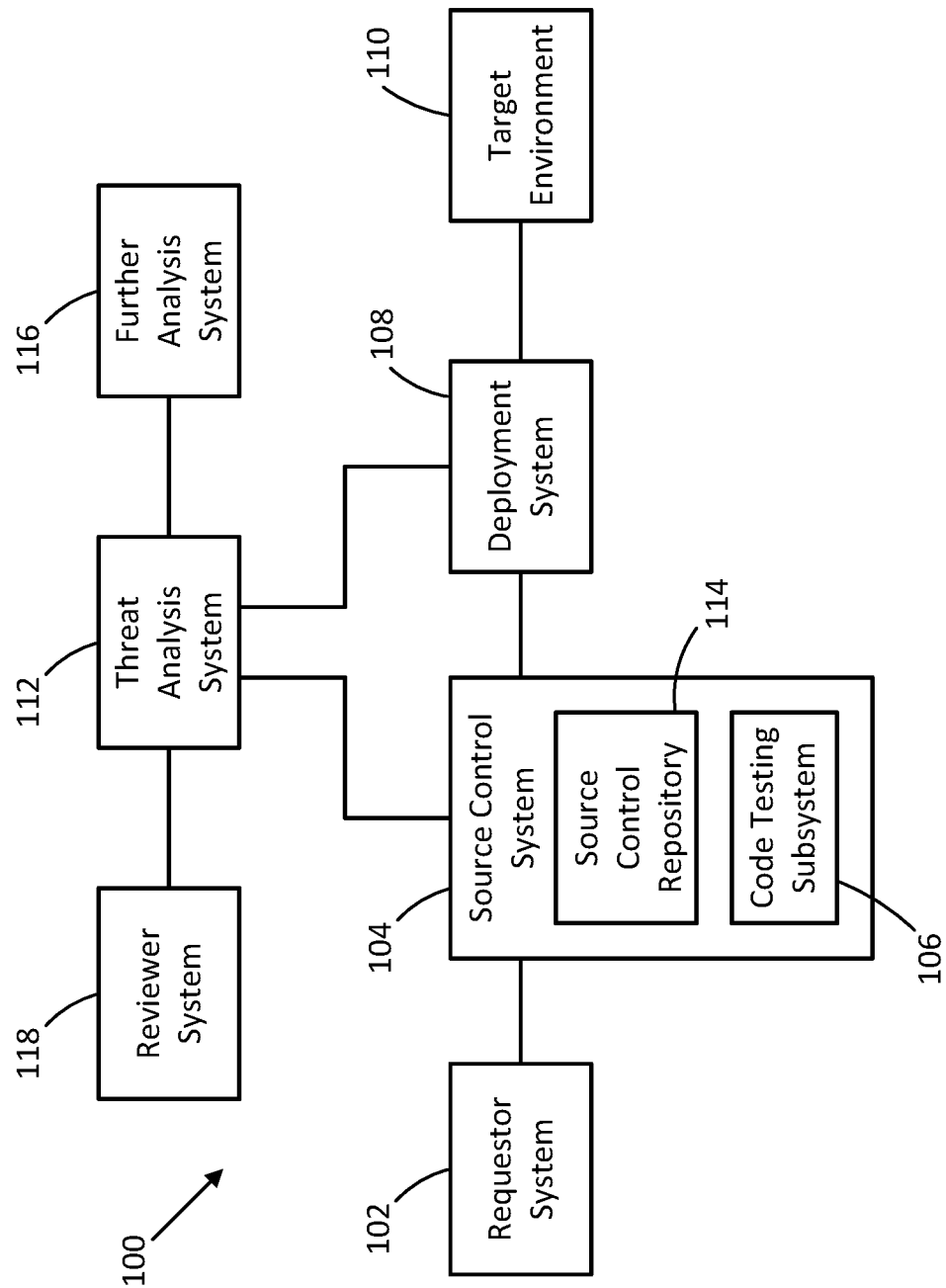
FIG. 1 illustrates an example system arrangement in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Herein described is a system for determining security threat changes in a security state of an infrastructure environment. For example, the system may receive a change requested by a user. The system may determine whether any security threat changes would be caused by the change and may identify the security threat changes that would be caused by the change. The system may determine whether an action is to be performed based on the identified security threat changes, such as determining whether the change is to be implemented, determining whether the change is to be prevented, determining whether to query a user to determine whether the change is to be implemented, and/or determining whether another action is to be performed.

Legacy approaches to implementing changes within an infrastructure environment involved a user (such as an engineer) reviewing the requested changes to determine security threats presented by the requested changes. Based on the determined security threats, the user would determine whether the changes were to be implemented. The user could implement the changes or cause the changes to be implemented within the infrastructure environment. However, this approach of manually reviewing the requested changes for security threats and determine whether the changes were to be implemented is time consuming. As infrastructure technology has developed to allow faster update times, the amount of time for the manual review and determination of whether the changes are to be allowed can be slower than the update times. Accordingly, the manual approach can cause delays in the changes being implemented in the infrastructure environment. This delay may be undesirable to the users of the infrastructure environment.

In addition to the speed at which changes can be made to the infrastructure environment, development in infrastructure technology has led to more complex infrastructure environments. In addition to the advantages that come with the more complex infrastructure environments, it has become more difficult to identify the changes to security threats that can be caused by changes to the infrastructure environments. This may present a greater chance that a user attempting to identify security threat changes may miss one or more of the security changes. Missing a security threat change could result in unintended risks that could lead to unauthorized access to the infrastructure environment.

The system disclosed herein may determine security threats for a requested change to an infrastructure environment. Based on the security threats, the system may determine an action to be performed. The action can be to perform the change, prevent performance of the change, query for further input on whether the change is to be performed, or some combination thereof. The system may perform the analysis at a relatively high speed, which may allow the security threat analysis and decision to be performed at a speed contiguous with the speed at which changes can be implemented with the advancements in infrastructure technology. Accordingly, often security threat analysis performed by the system presents shorter delays than manual security threat analysis. Therefore, the system may provide for faster changes to infrastructure environments than other approaches for implementing changes to infrastructure environments.

The system disclosed herein may further utilize information regarding security threats for infrastructure environments. The information may be continuously updated as additional security threats are identified. Accordingly, the system may utilize up-to-date information when identifying security threats caused by a requested change to an infrastructure environment. Additionally, the automated nature of the system may provide greater reliability in identifying security threats presented by a change and can reduce the probability that security threats fail to be identified.

FIG. 1 illustrates an example system arrangement 100 in accordance with some embodiments. In particular, the system arrangement 100 may illustrate a system arrangement with a system for performing security threat analysis (referred to as threat analysis system 112) capable of implementing a change to an infrastructure environment. In some embodiments, the infrastructure environment may be part of a cloud infrastructure and/or an IaaS architecture (such as the IaaS architecture described in relation to FIG. 9, the IaaS architecture described in relation to FIG. 10, the IaaS architecture described in relation to FIG. 11, and/or the IaaS architecture described in relation to FIG. 12).

The system arrangement 100 may include a requestor system 102. The requestor system 102 may be utilized by a user for generating a request to change an infrastructure environment. For example, the user of the requestor system 102 may be an authorized user for an infrastructure environment. The user may be allowed to make changes to the infrastructure environment, such as changing the infrastructure environment, or portions thereof, from public access to private access or vice versa, deploying an application in the infrastructure environment, connect elements within the infrastructure environment and/or with elements of another infrastructure environment, change the topology of the infrastructure environment, and/or other changes to the infrastructure environment. The requestor system 102 may generate a request for a change based on an indication from the user of a change to be made to the infrastructure environment. In some embodiments, the request for the change may comprise code that, when executed, can cause the change to be implemented to the infrastructure environment.

The system arrangement 100 may include a source control system 104. The source control system 104 may be coupled to the requestor system 102. The requestor system 102 may provide the request for the change to the source control system 104. The source control system 104 may include a source control repository 114, a code testing subsystem 106, or some combination thereof. The source control repository 114 may store code related to the infrastructure environment. The source control system 104 may store the request for the change received from the requestor system 102 in the source control repository 114. The code testing subsystem 106 may test the code from the source control repository 114 to verify that the code does not include errors. For example, the code testing subsystem 106 may test the request for the change to verify that the code of the request does not contain errors. For example, the code testing subsystem 106 may determine whether the code of the request includes any coding errors, any invalid values within the code, any references in the code to elements not included in the infrastructure environment, and/or other errors in the code.

The system arrangement 100 may include a deployment system 108. The deployment system 108 may deploy changes to an infrastructure environment. The source control system 104 may provide the change received from the requestor system 102 to the deployment system 108 for deployment to the infrastructure environment. In instances where the source control system 104 includes the code testing subsystem 106, the source control system 104 can provide the change to the deployment system after the code testing subsystem 106 has verified the code for the change. The source control system 104 may provide the code for the change to the deployment system 108 after the code has been verified. The deployment system 108 may prepare the code for deployment to one or more infrastructure environments.

The system arrangement 100 may include a target environment 110. The target environment 110 may comprise an infrastructure environment that is a target of the change being requested by the user of the requestor system 102. For example, the request for change requested by the user of the requestor system 102 may be directed to the target environment 110 in the illustrated embodiment. The target environment 110 may be coupled to the deployment system 108. The deployment system 108 may deploy the code of the change to the target environment 110, which may cause the change to be implemented in the target environment 110.

The system arrangement 100 may include a threat analysis system 112. The threat analysis system 112 may be coupled to, and/or implemented at least partially within, the source control system 104, the deployment system 108, or some combination thereof. The threat analysis system 112 may analyze any requested changes to infrastructure environments to determine security threats that may be introduced and/or mitigated by the changes. Further, the threat analysis system 112 may determine whether a requested change is to be allowed to be deployed by the deployment system 108, whether a requested change is to be prevented from being deployed by the deployment system 108, and/or whether further input and/or analysis is to be performed to determine whether a requested change is to be allowed to be deployed or prevented from being deployed by the deployment system 108.

In instances where the threat analysis system 112 is coupled to or implemented at least partially within the source control system 104, the threat analysis system 112 may intercept requests for changes provided to the source control system 104 by the requestor system 102. The threat analysis system 112 may intercept the request for changes prior to the request being stored in the source control repository 114, prior to the request being provided by the code testing subsystem 106, or after the request has been verified by the code testing subsystem 106. In embodiments where the request comprises code, the threat analysis system 112 may intercept the code corresponding to the request for changes.

In instances where the threat analysis system 112 is coupled to or implemented at least partially within the deployment system 108, the threat analysis system 112 may intercept the changes provided to the deployment system 108 by the source control system 104. For example, the threat analysis system 112 may intercept the changes prior to the deployment system 108 deploying the changes to the target environment 110. In embodiments where the change comprises code, the threat analysis system 112 may intercept the code corresponding to the changes.

In response to intercepting the change, the threat analysis system 112 may retrieve or generate a current threat model for an existing state of the target environment 110 to which the change is intended to be deployed. The existing state may be the state of the target environment 110 prior to the change being deployed to the target environment 110. In some embodiments, the threat analysis system 112 and/or the source control system 104 may store a current threat model for an existing state of the target environment 110, where the threat analysis system 112 may retrieve the current threat model. In some of these embodiments, the current threat model may be stored in a transient storage location (such as in a cache device), where the current threat model may be persisted for a limited amount of time. In other embodiments, a current threat model for an existing state may not be stored.

In instances where a current threat model is no longer available or has not been stored, the threat analysis system 112 may generate a current threat model for an existing state of the target environment 110. To generate the current threat model, the threat analysis system 112 may obtain and/or generate an environmental model for an existing state of the target environment 110. In instances where an environmental model is available (such as when the environmental model is stored by the source control system 104, the threat analysis system 112, and/or the target environment 110), the threat analysis system 112 may retrieve the environmental model for the existing state.

In instances where the environmental model for the existing state is unavailable, the threat analysis system 112 may retrieve service information (which may indicate capabilities and/or threats associated with services provided by the target environment 110) for an existing state of the target environment 110, configuration information (which may indicate elements of the target environment 110 and/or connections between the elements) for the existing state of the target environment 110, or some combination thereof. The threat analysis system 112 may retrieve the service information and/or the configuration information from the source control system 104, the target environment 110, or some combination thereof. The threat analysis system 112 may generate the environmental model for the existing state of the target environment 110 based on the service information and/or the configuration information for the existing state of the target environment 110. The environmental model for the existing state of the target environment 110 may include a list of services, capabilities, resources, and/or potential threats related to the existing state of the target environment 110.

The threat analysis system 112 may generate the current threat model for the existing state of the target environment 110 based on the environmental model for the existing state. For example, the threat analysis system 112 may access a threat information database that indicates threats corresponding to different infrastructure environment information. In particular, the threat analysis system 112 may utilize the list of services, capabilities, resources, and/or potential threats for the existing state of the target environment 110 indicated by the environmental model for the existing state to determine corresponding security threats based on threat information retrieved from the threat information database. The threat analysis system 112 may generate a current threat model for the existing state of the target environment 110 based on the security threats determined and/or the potential security threats for the existing state, where the current threat model indicates security threats for the existing state of the target environment 110 determined based on the security threats determined and/or the potential security threats for the existing state.

The threat analysis system 112 may further generate a change threat model corresponding to a new security state for the target environment 110. For example, the threat analysis system 112 may generate a change threat model for a new state for the target environment 110, where the new state being the state that the threat analysis system 112 would be in after application of the change. The new state of the target environment 110 may present a new security state having different security threats than a current security state of the target environment 110.

The threat analysis system 112 may generate an environmental model for the new state of the target environment 110 in order to produce the change threat model for the new state of the target environment 110. The environmental model for the new state may indicate what the service information and/or the configuration information for the target environment 110 would be after deployment of the change to the target environment 110. The threat analysis system 112 may generate the environmental model for the new state by taking the environmental model for the existing state of the target environment 110 and determining the changes to the environmental model that would be caused by the changes being deployed to the target environment 110. In embodiments where the changes are indicated by code, the threat analysis system 112 may determine the changes to be made to the environmental model based on the code. The threat analysis system 112 may apply determined changes to the environmental model for the existing state to produce the environmental model for the new state. The environmental model for the new state may include a list of services, capabilities, resources, and/or potential threats related to the new state of the target environment 110.

The threat analysis system 112 may generate the change threat model for the new state of the target environment 110 based on the environmental model for the new state. For example, the threat analysis system 112 may access the threat information database that indicates threats corresponding to different infrastructure environment information. The threat analysis system 112 may utilize the list of services, capabilities, resources, and/or potential threats for the new state of the target environment 110 indicated by the environmental model for the new state to determine corresponding security threats based on threat information retrieved from the threat information database. The threat analysis system 112 may generate a change threat model for the new state of the target environment 110 based on the security threats determined and/or the potential security threats for the new state, where the change threat model indicates security threats for the new state of the target environment 110 determined based on the security threats determined and/or the potential security threats for the new state.

Once the current threat model and the change threat model are available to the threat analysis system 112, the threat analysis system 112 may identify a security change in a security state of the target environment 110 between the existing state and the new state of the target environment 110. For example, the threat analysis system 112 may compare the change threat model with the current threat model. Based on the comparison, the threat analysis system 112 may determine whether there has been any changes in security threats that would be presented in the target environment 110 due to the change. In some embodiments, the threat analysis system 112 may compare the security threats for one or more resources of the target environment 110 represented in the change threat model and the current threat model to determine the changes in the security threats for the one or more resources. The security change in the security state of the target environment 110 may comprise the determined changes in security threats based on the comparison. The security change may indicate threats that have been introduced (for example, new threats that will be presented by the new state of the target environment 110 that were not presented by the existing state of the target environment 110) and/or threats that have been mitigated (for example, threats presented by the existing state of the target environment 110 that will not be presented by the new state of the target environment 110).

The threat analysis system 112 may determine one or more actions to be taken based on the determined security change. For example, the threat analysis system 112 may determine whether to cause the change to be deployed by the deployment system 108 to the target environment 110, prevent the change from being deployed by the deployment system 108 to the target environment 110, provide an indication to the requesting user that the change has been deployed, provide an indication to the requesting user that the change has not been deployed, query a user for input whether the change is to be deployed or prevented from being deployed, provide the change to another system for further analysis, or some combination thereof based on the determined security change.

The threat analysis system 112 may retrieve model rules that define what action is to be performed based on the determined security change. The model rules may comprise rules that can be applied to the determined security change to determine the action to be taken. In some embodiments, the model rules may include rules that determine the action to be taken based on changes in security threats between the new state and the existing state of the target environment 110 and/or security threats presented by the new state of the target environment 110. For example, the model rules may comprise model difference rules, full model rules, or both. The model difference rules may be applied to the determined changes in security threats between the new state and the existing state and may determine an action to be performed based on the determined changes. The full model rules may be applied to the determined changes in security threats and/or one or more unchanged security threats presented in the new state of the target environment 110. In particular, while in many instances the action to be performed can be determined on the security threat changes caused by the requested changes to the target environment 110, the threat analysis system 112 may take into account one or more unchanged security threats in combination with the changed security threats to determine the action to be performed. The threat analysis system 112 may determine the action to be taken based on the model rules and may perform the determined action.

In instances where the threat analysis system 112 determines the action to be taken is to query for input, the threat analysis system 112 may provide the query to the requestor system 102 and/or a reviewer system 118. The reviewer system 118 may correspond to and/or be operated by an authorized user. The threat analysis system 112 may cause a query to be displayed on the requestor system 102 and/or the reviewer system 118, where the query asks for user input as to whether the change should be deployed to the target environment 110 or be prevented from being deployed to the target environment 110. The threat analysis system 112 may receive the response to the query from the requestor system 102 and/or the reviewer system 118 and determine the action to be performed based on the response. In some embodiments, the reviewer system 118 may be omitted, such as when the actions available to the threat analysis system 112 does not include the query action and/or the threat analysis system 112 is configured to query the requestor system 102.

In instances where the threat analysis system 112 determines the action to be taken is to provide the change to another system for further analysis, the threat analysis system 112 may provide the change to a further analysis system 116. The further analysis system 116 may perform additional analysis to the analysis performed by the threat analysis system 112. In some embodiments, the further analysis system 116 may perform analysis that can take more time than the analysis performed by the threat analysis system 112. For example, the threat analysis system 112 may perform analysis actions that have a maximum processing time below a threshold time and the further analysis system 116 may perform analysis actions that can take longer than the threshold time. In some embodiments, the further analysis system 116 may obtain further information not available to the threat analysis system 112 at the time of the analysis. The further analysis system 116 may determine the action to be performed and may indicate to the threat analysis system 112 the action to be performed or may cause the action to be performed. In some embodiments, the further analysis system 116 may be omitted, such as when the actions available to the threat analysis system 112 does not include the action of providing the change to another system for further analysis. In some embodiments, the threat analysis system 112 may perform the analysis that would be performed by the further analysis system 116, but may perform the analysis in the background such as not to delay other analysis to be performed by the threat analysis system 112.

In instances where the threat analysis system 112 determines that the action to be taken is to cause the change to be deployed, the threat analysis system 112 may cause the deployment system 108 to deploy the change to the target environment 110. For example, the threat analysis system 112 may provide an indication to the source control system 104 to provide the change (such as the code corresponding to the change) to the deployment system 108 for deployment to the target environment 110 in embodiments where the threat analysis system 112 is coupled to and/or implemented at least partially within the source control system 104. In embodiments where the threat analysis system 112 is coupled to and/or implemented at least partially within the deployment system 108, the threat analysis system 112 may provide an indication to the deployment system 108 to deploy the change to the target environment 110. In some of these embodiments, the threat analysis system 112 may cause an indication to be displayed on the requestor system 102 that the change is being or has been deployed to the target environment 110. The deployment system 108 may cause the change to be deployed to the target environment 110 based on the indication to deploy the change from the threat analysis system 112 or receiving the change from the source control system 104.

In instances where the threat analysis system 112 determines that the action to be taken is to prevent the change from being deployed, the threat analysis system 112 may cause the change (such as the code corresponding to the change) not to be deployed to the target environment 110. For example, the threat analysis system 112 may provide an indication to the source control system 104 not to provide the change to the deployment system 108 for deployment in embodiments where the threat analysis system 112 is coupled to and/or implemented at least partially in the source control system 104. In embodiments where the threat analysis system 112 is coupled to and/or implemented at least partially within the deployment system 108, the threat analysis system 112 may provide an indication to the deployment system 108 not to deploy the change to the target environment 110. In some of these embodiments, the threat analysis system 112 may cause an indication to be displayed on the requestor system 102 that the change has not or will not be deployed to the target environment 110.

Figure 2:
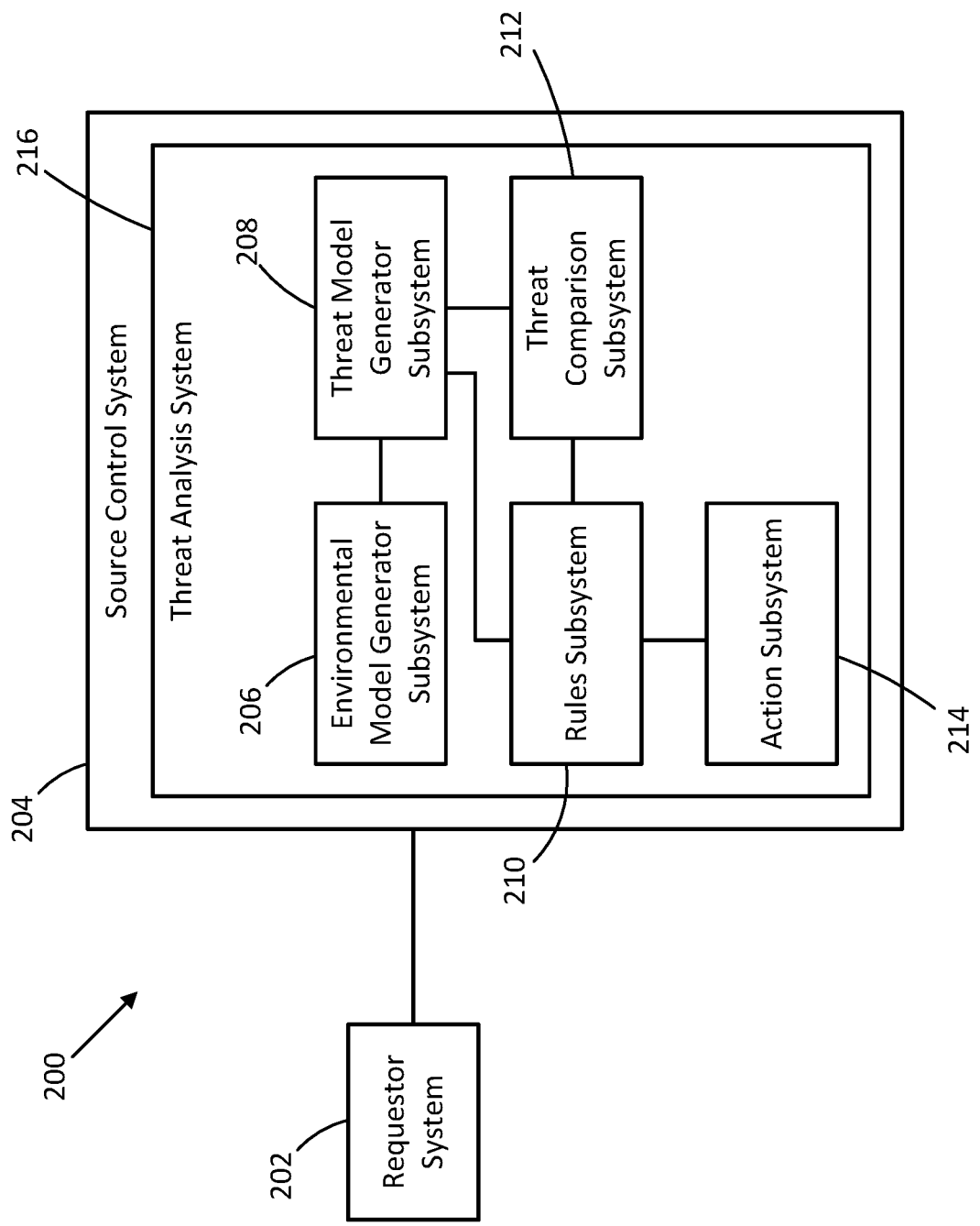
FIG. 2 illustrates another system arrangement in accordance with some embodiments.

FIG. 2 illustrates another system arrangement 200 in accordance with some embodiments. For example, the system arrangement 200 illustrates an example of a threat analysis system 216 implemented within a source control system 204. It should be understood that the threat analysis system 216 may be implemented in a deployment system (such as the deployment system 108 (FIG. 1)) in a similar manner that the threat analysis system 216 is implemented in the source control system 204.

The system arrangement 200 may include a requestor system 202 coupled to a source control system 204. The requestor system 202 may include one or more of the features of the requestor system 102 (FIG. 1). The source control system 204 may include one or more of the features of the source control system 104 (FIG. 1). The requestor system 102 may provide a request for a change to be made to a target environment (such as the target environment 110 (FIG. 1)). In some embodiments, the request and/or the change may include code that when deployed to the target environment causes a change to the target environment. The source control system 204 may receive the request for the change from the requestor system 202.

The threat analysis system 216 may intercept the change provided by the requestor system 202. In some embodiments, the threat analysis system 216 may be intercepted after the change has been verified and/or tested (such as by the code testing subsystem 106 (FIG. 1)). The threat analysis system 216 may perform analysis of the change to determine security threat changes to be caused by the change and to determine an action to be performed based on the security threat changes.

The threat analysis system 216 may include an environmental model generator subsystem 206. The environmental model generator subsystem 206 may generate and/or obtain an environmental model for an existing state of the target environment and an environmental model for a new state of the target environment after deployment of the change to the target environment based on intercepting the change. For example, the environmental model generator subsystem 206 may generate and/or obtain the environmental models in a same manner that the threat analysis system 112 (FIG. 1) generates and/or obtains the environmental models as described in relation to FIG. 1. The environmental model for the existing state of the target environment may include a list of service, capabilities, resources, and/or potential threats related to the existing state of the target environment. The environmental model for the new state of the target environment may include a list of service, capabilities, resources, and/or potential threats related to the new state of the target environment.

The threat analysis system 216 may include a threat model generator subsystem 208. The threat model generator subsystem 208 may be coupled to the environmental model generator subsystem 206. The threat model generator subsystem 208 may receive the environmental model for the existing state of the target environment and the environmental model for the new state of the target environment from the environmental model generator subsystem 206. The threat model generator subsystem 208 may generate a current threat model for the existing state of the target environment based on the environmental model for the existing state. Further, the threat model generator subsystem 208 may generate a change threat model for the new state of the target environment based on the environmental model for the new state. The threat model generator subsystem 208 may generate the threat models in a same manner that the threat analysis system 112 generates the threat models as described in relation to FIG. 1. For example, the threat model generator subsystem 208 may utilize the list of services, capabilities, resources, and/or potential threats from the environmental models to determine security threats for the existing state and the new state of the target environment. Based on the determined security threats and/or the potential security threats from the environmental models, the threat model generator subsystem 208 may generate the current threat model for the existing state of the target environment and the change threat model for the new state of the target environment.

The threat analysis system 216 may include a threat comparison subsystem 212. The threat comparison subsystem 212 may be coupled to the threat model generator subsystem 208. The threat comparison subsystem 212 may receive the current threat model and the change threat model from the threat model generator subsystem 208. The threat comparison subsystem 212 may compare the current threat model with the change threat model to determine whether there is a security change between the existing state and the new state of the target environment. The threat comparison subsystem 212 may identify the security change based on the comparison.

The threat analysis system 216 may include a rules subsystem 210. The rules subsystem 210 may be coupled to the threat comparison subsystem 212. The rules subsystem 210 may receive an indication of the security change determined by the threat comparison subsystem 212. The rules subsystem 210 may utilize model difference rules to determine an action to be performed based on the security change. For example, the model difference rules may indicate an action to be performed by the threat analysis system 216 based on the security change. In some embodiments, the rules subsystem 210 may be coupled to the threat model generator subsystem 208. The rules subsystem 210 may receive the change threat model from the threat model generator subsystem 208 for the new state of the target environment. The rules subsystem 210 may utilize full model rules to determine an action to be performed based on the change threat model. For example, the full model rules may indicate an action to be performed by the threat analysis system 216 based on the change threat model. The rules subsystem 210 may determine an action to be performed by the threat analysis system 216 based on the model rules.

The threat analysis system 216 may include an action subsystem 214. The action subsystem 214 may be coupled to the rules subsystem 210. The action subsystem 214 may receive an indication of an action to be performed by the threat analysis system 216. The actions may include causing the change to be deployed by the deployment system 108 to the target environment 110, preventing the change from being deployed by the deployment system 108 to the target environment 110, providing an indication to the requesting user that the change has been deployed, providing an indication to the requesting user that the change has not been deployed, querying a user for input whether the change is to be deployed or prevented from being deployed, providing the change to another system for further analysis, or some combination thereof based on the determined security change. The action subsystem 214 may cause the action to be performed.

Figure 3:
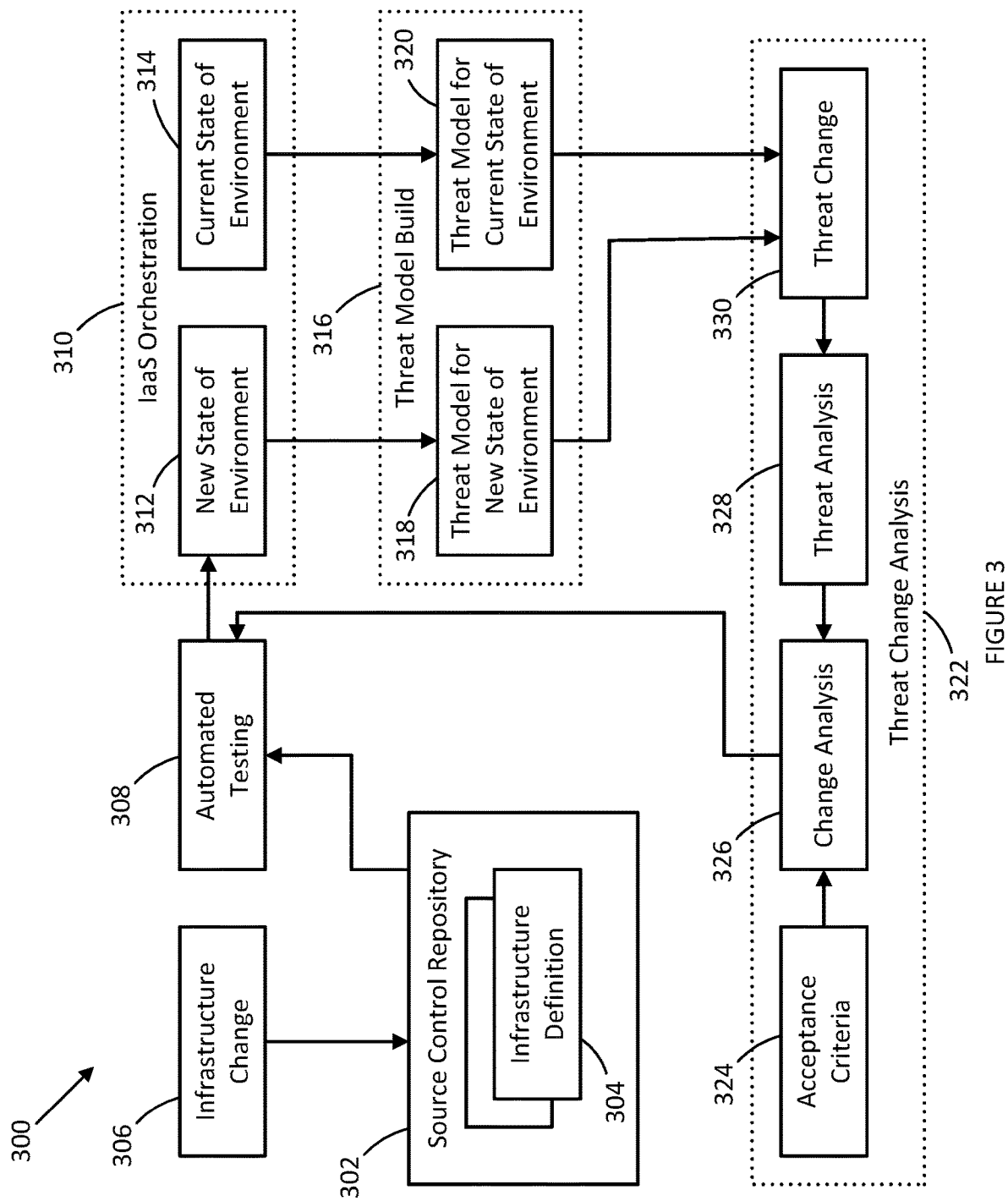
FIG. 3 illustrates an example flow for threat analysis in accordance with some embodiments.

FIG. 3 illustrates an example flow 300 for threat analysis in accordance with some embodiments. The flow 300, or portions thereof, may be performed by a source control system (such as the source control system 104 (FIG. 1)), a threat analysis system (such as the threat analysis system 112 (FIG. 1) and/or the threat analysis system 216 (FIG. 2)), or some combination thereof. The flow 300 may perform threat analysis of a proposed infrastructure change to determine whether the infrastructure change is to be allowed based on the threat analysis.

The flow 300 may include a source control repository 302. The source control repository 302 may include one or more of the features of the source control repository 114 (FIG. 1). The source control repository 302 may receive an infrastructure change 306. The infrastructure change 306 may request a change to a target environment (such as the target environment 110 (FIG. 1)). The infrastructure change 306 may be provided by a requestor system (such as the requestor system 102 (FIG. 1) and/or the requestor system 202 (FIG. 2)). The source control repository 302 may store the infrastructure change 306. Further, the source control repository 302 may store one or more infrastructure definitions 304 that define infrastructure environments (such as the target environment). The infrastructure definitions 304 may provide service information and/or configuration information for each of the corresponding infrastructure environments.

The source control repository 302 may provide the infrastructure change 306 for automated testing 308. The automated testing 308 may include testing of code corresponding to the infrastructure change 306, such as the testing of code that may be performed by the code testing subsystem 106 (FIG. 1).

The automated testing 308 may further initiate threat analysis in the illustrated embodiment. The automated testing 308 may provide the infrastructure change 306 and/or the code corresponding to the infrastructure change 306 to an IaaS orchestration subsystem 310, where the IaaS orchestration subsystem 310 may generate a new state of the environment 312. In particular, the IaaS orchestration subsystem 310 may generate an environmental model for the new state of the target environment, where the new state is the state that would be produced after the deployment of the infrastructure change 306 to the target environment. The IaaS orchestration subsystem 310 may further generate or obtain a current state of the environment 314. In particular, the IaaS orchestration subsystem 310 may generate or obtain an environmental model for the current state of the environment, where the current state is the state of the target environment prior to deployment of the infrastructure change 306.

The IaaS orchestration subsystem 310 may provide the new state of the environment 312 and the current state of the environment 314 to a threat model build subsystem 316. The threat model build subsystem 316 may generate a threat model for the new state of the environment 318 based on the new state of the environment 312. For example, the threat model build subsystem 316 may generate the threat model for the new state based on the environmental model for the new state of the environment corresponding to the new state of the environment 312. The threat model for the new state may include one or more of the features of the change threat models described throughout this disclosure. The threat model build subsystem 316 may further generate a threat model for the current state of the environment 320 based on the current state of the environment 314. For example, the threat model build subsystem 316 may generate the threat model for the current state based on the environmental model for the current state of the environment corresponding to the current state of the environment 314. The threat mode for the current state may include one or more of the features of the current threat models described throughout this disclosure.

The threat model build subsystem 316 may provide the threat model for the new state of the environment 318 and the threat model for the current state of the environment 320 to a threat change analysis subsystem 322. The threat change analysis subsystem 322 may compare the threat model for the new state of the environment 318 and the threat model for the current state of environment 320 to determine threat change 330 between the new state and the current state. The threat change 330 may indicate changes to security threats between the new state and the current state.

The threat change analysis subsystem 322 may perform threat analysis 328 with the threat change 330. In some embodiments, the threat analysis 328 may include determining a type or types of the threat change 330, determining an indication of risk (such as a score) for the threat change 330, or some combination thereof. The threat analysis 328 may produce an indication of one or more security threats presented by the infrastructure change 306, one or more resources corresponding to the one or more security threats, or some combination thereof.

The threat change analysis subsystem 322 may perform change analysis 326 based on the threat analysis 328. The threat change analysis subsystem 322 may obtain acceptance criteria 324 that indicates when the infrastructure change 306 is acceptable for deployment to the target environment. The change analysis 326 may determine whether the infrastructure change 306 is acceptable based on the indication generated by the threat analysis 328 and the acceptance criteria 324. For example, when the threat analysis 328 determines a type or types of the threat change 330, the acceptance criteria 324 may indicate the type or types of the threat change 330 are acceptable for deployment of the infrastructure change 306. Accordingly, the change analysis may determine whether the infrastructure change 306 is acceptable for deployment. The change analysis 326 may provide an indication of whether the infrastructure change 306 is acceptable for deployment to the automated testing 308, where the automated testing 308 may proceed in accordance with the indication.

Figure 4:
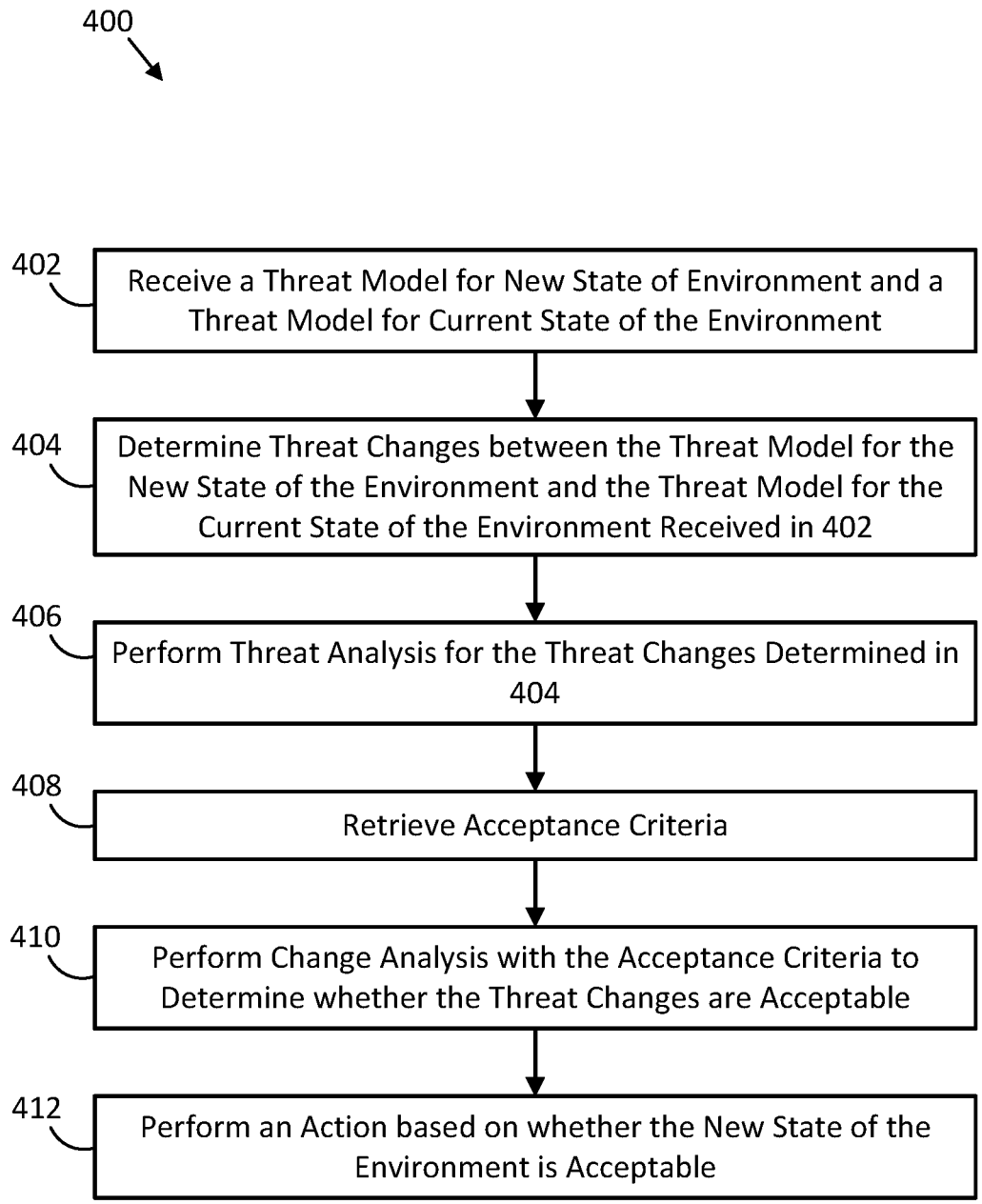
FIG. 4 illustrates an example process determining an action to be performed in accordance with some embodiments.

FIG. 4 illustrates an example process 400 determining an action to be performed in accordance with some embodiments. The process 400 may be performed by a threat analysis system (such as the threat analysis system 112 (FIG. 1) and/or the threat analysis system 216 (FIG. 2)) and/or a threat change analysis subsystem (such as the threat change analysis subsystem 322 (FIG. 3)). For brevity, the process 400 is described herein as being performed by a threat analysis system, although it should be understood that a threat change analysis subsystem may perform the process 400 in other embodiments.

In 402, the threat analysis system may receive a threat model for a new state of an environment and a threat model for a current state of the environment. For example, the threat model for the new state may be a threat model produced for a state of the environment after a requested change has been deployed (such as the change threat models described throughout the disclosure). The threat model for the current state may be a threat model produced for a state of the environment prior to the requested change being deployed. The environment may comprise a infrastructure environment, such as the target environment 110 (FIG. 1).

In 404, the threat analysis system may determine threat changes between the threat model for the new state of the environment and the threat model for the current state of the environment received in 402. For example, the threat analysis system may compare the threat model for the new state of the environment and the threat model for the current state of the environment. Based on the comparison, the threat analysis system may determine threat changes between the threat model for the new state of the environment and the threat model for the current state of the environment. In some embodiments, determining the threat changes in 404 may include one or more of the features of determining the threat changes 330 (FIG. 3).

In 406, the threat analysis system may perform threat analysis for the threat changes determined in 404. In some embodiments, the threat analysis system may determine a type or types of the threat changes, determine an indication of risk (such as a score) for the threat changes, or some combination thereof. The threat analysis system may produce an indication of one or more security threats presented based on the threat changes, one or more resources corresponding to the one or more security threats, or some combination thereof. In some embodiments, the threat analysis performed in 406 may include one or more of the features of the threat analysis 328 (FIG. 3).

In 408, the threat analysis system may retrieve acceptance criteria. For example, the retrieve acceptance criteria that indicates whether the request change is acceptable for deployment to the target environment. In some embodiments, the acceptance criteria may include full model rules, model difference rules, or some combination thereof. The acceptance criteria may indicate whether a change is acceptable for deployment to the target based on security threat information related to the change. In some embodiments, the acceptance criteria may include one or more of the features of the acceptance criteria 324 (FIG. 3).

In 410, the threat analysis system may perform change analysis with the acceptance criteria to determine whether the threat changes are acceptable. For example, the threat analysis system may determine whether the threat changes are acceptable and determine whether the requested change is acceptable for deployment to the target environment based on whether the threat changes are acceptable. The threat analysis may apply the acceptance criteria retrieved in 408 to the determinations from 406 to determine whether the threat changes are acceptable. In some embodiment, the change analysis performed in 410 may include one or more of the features of the change analysis 326 (FIG. 3).

In 412, the threat analysis system may perform an action based on whether the new state of the environment is acceptable. The new state of the environment may be acceptable if the threat changes are determined to be acceptable in 410. If the new state of the environment is determined to be acceptable, the threat analysis system may, as the action, cause the requested change to be deployed to the target environment to change the target environment in accordance with the requested change. If the new state of the environment is determined not to be acceptable, the threat analysis system may, as the action, prevent the request change from being deployed to the target environment.

While the process 400 is illustrated with the operations in an order, it should be understood that the operations of the process 400 may be in a different order in other embodiments and/or one or more of the operations of the process 400 may be performed concurrently. Further, one or more of the operations of the process 400 may be omitted in other embodiments and/or the process 400 may be performed as part of a larger process with additional operations.

Figure 5:
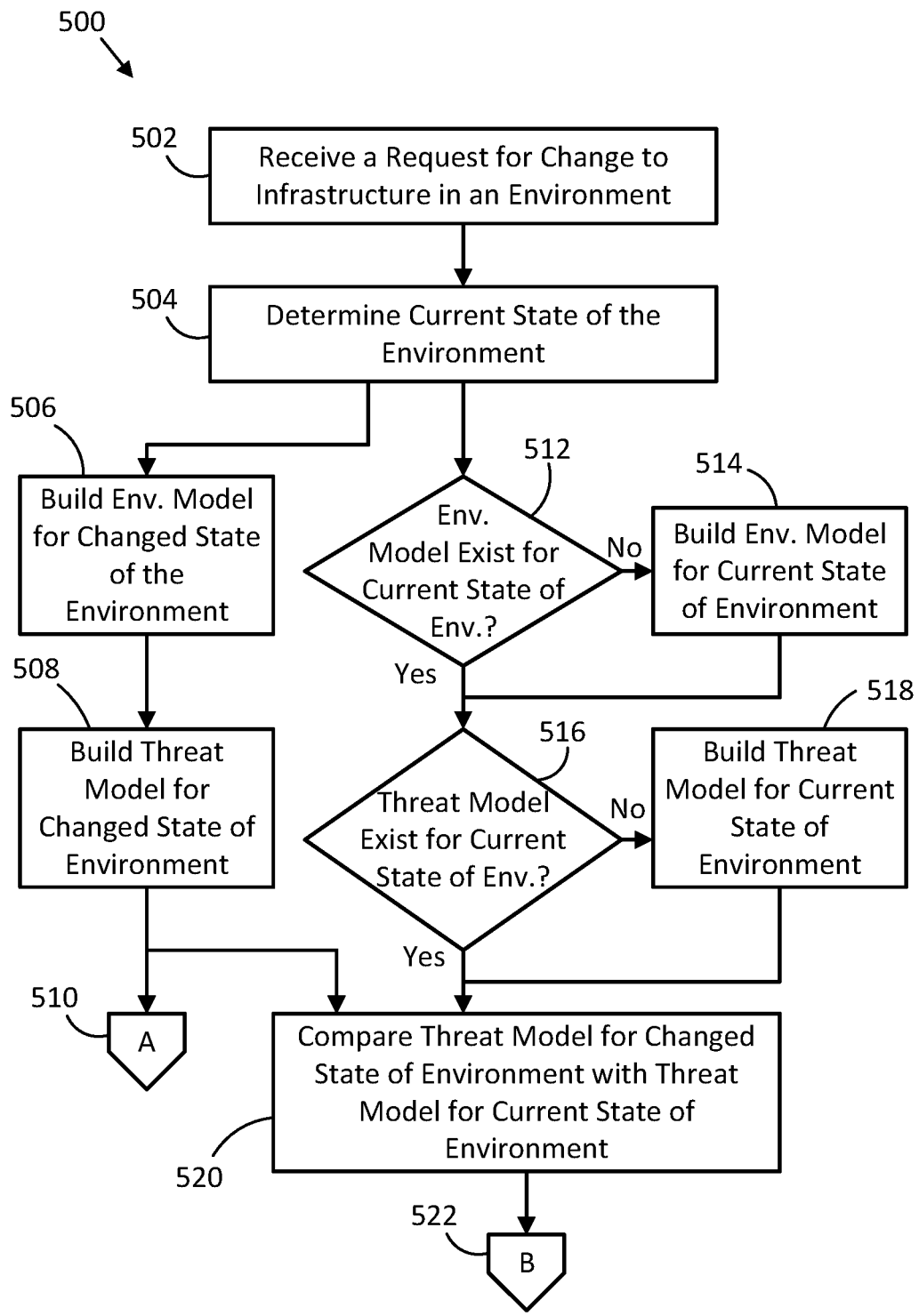
FIG. 5 illustrates a first part of an example flow for determining an action to be performed based on a requested change for an environment in accordance with some embodiments.

FIG. 5 illustrates a first part of an example flow 500 for determining an action to be performed based on a requested change for an environment in accordance with some embodiments. The flow 500 may be performed for a requested change to a target environment, such as the target environment 110 (FIG. 1). The flow 500 may be performed by a threat analysis system, such as the threat analysis system 112 (FIG. 1) and/or the threat analysis system 216 (FIG. 2).

In 502, the threat analysis system may receive a request for change to infrastructure in a target environment. The request for change may be received from a requestor system, such as the requestor system 102 (FIG. 1) and/or the requestor system 202 (FIG. 2). Receiving the request for change may include intercepting the request from a source control system (such as the source control system 104 (FIG. 1) and/or the source control system 204 (FIG. 2)) or a deployment system (such as the deployment system 108 (FIG. 1)). The request for change may include a request to change services provided by an infrastructure in the target environment, a request to change a configuration of components (such as processors, memory, networking device, and/or computer devices), or some combination thereof.

In 504, the threat analysis system may determine a current state of the environment. For example, the threat analysis system may determine an indication of the current state of the environment. In some embodiments, determining the current state of the environment may include determining service information, configuration information, or some combination thereof for the environment prior to the change being implemented in the environment. The threat system may determine the current state of the environment by querying the source control system for the current state, querying the deployment system for current state, and/or querying the environment for the current state.

In 512, the threat analysis system may determine whether an environmental model exists for the current state of the environment. The threat analysis system may determine whether the threat analysis system has an environmental model stored for the current state, may query the source control system to determine if an environmental model for the current state can be retrieved from the source control system, may query the deployment system to determine if an environmental model for the current state can be retrieved from the deployment system, may query the environment to determine if an environmental model for the current state can be retrieved from the environment, or some combination thereof. If the threat analysis system determines that an environmental model for the current state of the environment exists and can be retrieved, the flow 500 may proceed to 516. If the threat analysis system determines that an environmental model for the current state of the environment does not exist or cannot be retrieved, the flow 500 may proceed to 514.

In 514, the threat analysis system may build an environmental model for the current state of the environment. The threat analysis system may build the environmental model for the current state based on the service information and/or the configuration information for the current state, which may have been determined in 504. The environmental model for the current state of the environment may include a list of services, capabilities, resources, and/or potential threats related to the current state of the environment. In instances where an environmental for the current state is determined to exist and can be retrieved in 512, 514 may be omitted.

In 516, the threat analysis system may determine whether a threat model exists for the current state of the environment. The threat analysis system may determine whether the threat analysis system has a threat model stored for the current state, may query the source control system to determine if a threat model for the current state can be retrieved from the source control system, may query the deployment system to determine if a threat model for the current state can be retrieved from the deployment system, may query the environment to determine if a threat model for the current state can be retrieved from the environment, or some combination thereof. If the threat analysis system determines that a threat model for the current state of the environment exists and can be retrieved, the flow 500 may proceed to 520. If the threat analysis system determines that a threat model for the current state of the environment does not exist or cannot be retrieved, the flow 500 may proceed to 518.

In 518, the threat analysis system may build a threat model for the current state of the environment. The threat analysis system may utilize the environmental model for the current state of the environment to build the threat model for the current state of the environment. The threat analysis system may build the threat model for the current state in same manner as current threat models are generated as described throughout this disclosure. For example, the threat analysis system may retrieve threat information from a threat information database. The threat information may indicate security threats that are present based on the list of services, capabilities, resources, and/or potential threats indicated by the environmental model for the current state of the environment. The threat model for the current state may indicate the security threats and/or the potential threats for the current state of the environment. In instances where the threat analysis system determines that the threat model exists and can be retrieved in 516, 518 may be omitted.

In 506, the threat analysis system may build an environmental model for a changed state of the environment. The changed state of the environment may be the state of the environment after the change has been deployed to the environment. The threat analysis system may determine what the service information and/or the configuration information for the changed state of the environment after the change has been deployed to environment would be. The threat analysis system utilize the service information and/or the configuration information for the current state and determine the changes to the service information and/or the configuration information that would be caused by the request change to build the environmental model. The environmental model for the changed state of the environment may include a list of services, capabilities, resources, and/or potential threats related to the changed state of the environment.

In 508, the threat analysis system may build a threat model for the changed state of the environment. The threat analysis system may utilize the environmental model for the changed state of the environment to build the threat model for the changed state of the environment. The threat analysis system may build the threat model for the changed state in same manner as change threat models are generated as described throughout this disclosure. For example, the threat analysis system may retrieve threat information from a threat information database. The threat information may indicate security threats that are present based on the list of services, capabilities, resources, and/or potential threats indicated by the environmental model for the changed state of the environment. The threat model for the changed state may indicate the security threats and/or the potential threats for the changed state of the environment.

In 520, the threat analysis system may compare the threat model for the changed state of the environment with the threat model for the current state of the environment. For example, the threat analysis system may compare the security threats and/or potential threats for the changed state from the threat model for the changed state with the security threats and/or potential threats for the current state from the threat model for the current state.

Figure 6:
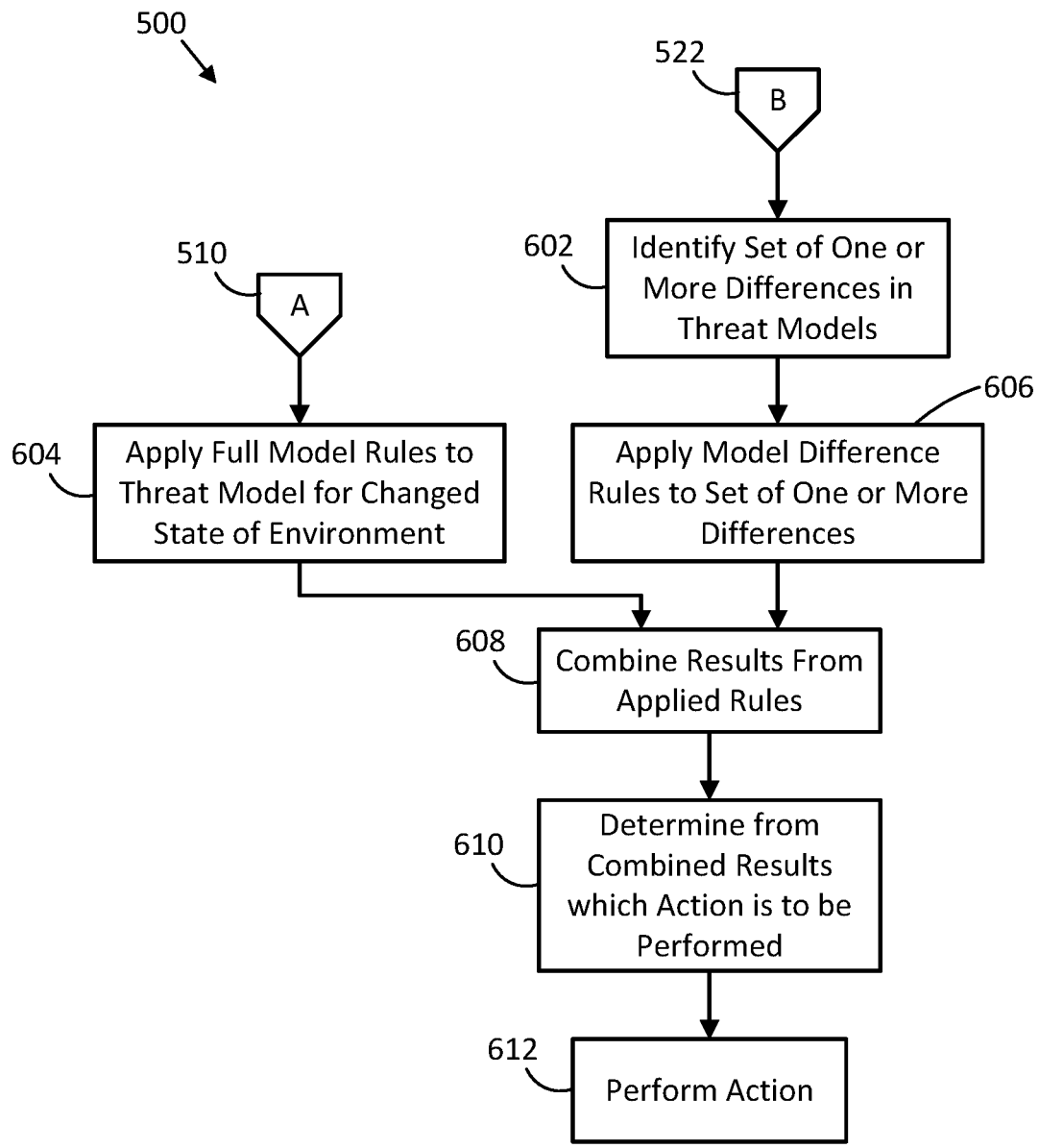
FIG. 6 illustrates a second part of the example flow in accordance with some embodiments.

FIG. 6 illustrates a second part of the example flow 500 in accordance with some embodiments. The reference 510 in FIG. 5 may connect to the reference 510 in FIG. 6. Further, the reference 522 in FIG. 5 may connect to the reference 522 in FIG. 6.

In 602, the threat analysis system may identify a set of one or more differences in the threat models. For example, the threat analysis system may identify one or more differences between the threat model for the changed state of the environment and the threat model for the current state of the environment. The threat analysis system may determine the one or more differences based on the comparison of the threat models performed in 520. The threat analysis system may generate a set with the one or more identified differences.

In 606, the threat analysis system may apply model difference rules to the set of one or more differences. The threat analysis system may retrieve model difference rules. The model difference rules may indicate an action to be performed by the threat analysis system based on the threat differences caused by the requested change. The threat analysis system may determine an action to be performed based on application of the model difference rules to set of one or more differences.

In 604, the threat analysis may apply full model rules to the threat model for the changed state of the environment. The full model rules may indicate an action to be performed by the threat analysis system based on the threat model for the changed state. For example, the full model rules may indicate an action to be performed based on the security threats and/or the potential threats indicated by the threat model for the changed state of the environment.

In 608, the threat analysis system may combine the results from the applied rules. In particular, the threat analysis system may combine the action to be taken from the application of the model difference rules in 606 and the action to be taken from the application of the full model rules in 604. Combining the actions may include creating combined results from which an action can be selected to be performed by the threat analysis system. The combined results may include the action form 604 and the action from 606.

In 610, the threat analysis system determine from the combined results an action to be performed by the threat analysis system. The threat analysis system may determine an action from the actions of 604 and the 606 included in the combined results to be performed by the threat analysis system. The actions within the combined results may be ranked such that some of the actions are ranked higher and will be selected based on the higher ranking. For example, preventing deployment of the change may have the highest ranked action, followed by presenting an inquiry to a user as to whether the change is to be deployed, providing the change to a system for further analysis, and deploying the change. Accordingly, determining the action may result in selecting preventing deployment of the change first if either of the actions from 604 and 606 include preventing the deployment, selecting presenting the inquiry to a user if the actions from 604 and 606 do not include preventing the deployment and include presenting the inquiry, selecting providing the change to the system for further analysis if the actions from 604 and 606 do not include preventing the deployment and presenting the inquiry and includes providing the change to the other system, and selecting deploying the change if the actions from 604 and 606 do not include any of the other actions. In instances where the action selected includes notifying a requestor of the action to be performed, the action selected by the threat analysis system may include providing a notification to the requestor. In other embodiments, if either of the actions being selected from includes notifying a requestor of the action to be performed, the action selected by the threat analysis system may include providing a notification to the requestor.

In 612, the threat analysis system may perform the action determined in 610. For example, the threat analysis system may perform the action or cause the action to be performed that was selected in 610. In some embodiments, the threat analysis system may perform the action by providing one or more indications to the source control system, the deployment system, and/or the requestor system to cause the action to be performed. For example, the threat analysis system may provide an indication to the deployment system that indicates to the deployment system whether the change is to be deployed to the target environment in some embodiments. In some embodiments, the threat analysis system may provide an indication to the source control system whether to provide the change to the deployment system.

While the flow 500 illustrates certain operations, it should be understood that one or more of the operations may be omitted from the flow 500 and/or one or more operations may be added to the flow 500 in other embodiments. Further, it should be understood that the operations of the flow 500 may be performed at different time and/or one or more of the operations of the flow 500 may be performed concurrently.

Figure 7:
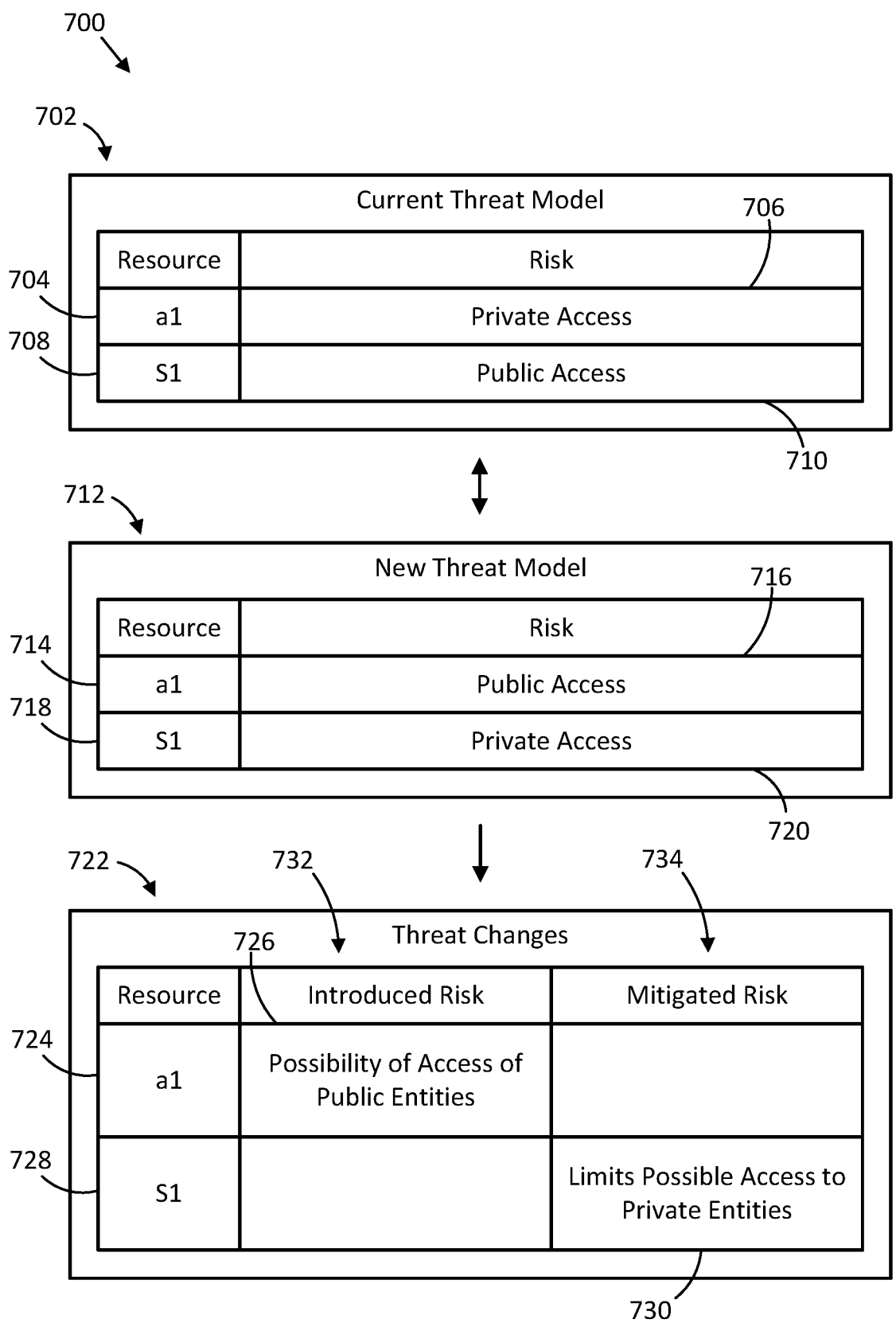
FIG. 7 illustrates example threat models that may be utilized for threat analysis in accordance with some embodiments.

FIG. 7 illustrates example threat models 700 that may be utilized for threat analysis in accordance with some embodiments. For example, the threat models 700 include threat models for different states of a target environment and threat change models indicating the threat changes between the different states. The threat models 700 may be generated and/or utilized by a threat analysis system (such as the threat analysis system 112 (FIG. 1) and/or the threat analysis system 216 (FIG. 2)) and/or a threat change analysis subsystem (such as the threat change analysis subsystem 322 (FIG. 3)). For brevity, the threat models 700 are described as being generated and/or utilized by a threat analysis system herein, although it should be understood that the threat models 700 may be generated and/or utilized by a threat change analysis subsystem in other embodiments.

The threat models 700 include a current threat model 702. The current threat model 702 may be for a current state of the target environment, where the current state of the target environment is prior to deployment of a requested change to the target environment. The current threat model 702 may be generated by the threat analysis system based on an environmental model for the current state of the target environment as described throughout this disclosure.

The current threat model 702 may indicate one or more resources included within the target environment. The resources may include physical resources (such as subnets, networks, processors, memory devices, network devices, and/or other physical computer resources) and/or constructs (such as an account, a virtual cloud network (VCN), an instance, and/or other computer constructs). In the illustrated embodiment, the resources include a first resource 704 (shown as resource 'a1') and a second resource 708 (shown as resource 'S1'). In some embodiments, the resources included in the current threat model 702 may be limited to resources that can present security risks.

The current threat model 702 may indicate risks that can be presented by the resources and/or security settings of the resources (which collectively is referred to as 'risks' herein) at the current state of the target environment. In particular, the current threat model 702 may include risks for each of the corresponding resources included in the current threat model 702 with the target environment at the current state. In the illustrated embodiment, the current threat model 702 includes a first risk 706 corresponding to the first resource 704 and a second risk 710 corresponding to the second resource 708. The first risk 706 indicates that the first resource 704 has private access at the current state in the illustrated embodiment. The second risk 710 indicates that the second resource 708 has public access at the current state in the illustrated embodiment.

The threat models 700 include a new threat model 712. The new threat model 712 may be for a new state of the target environment, where the new state of the target environment is after deployment of a requested change to the target environment. The new threat model 712 may be generated by the threat analysis system based on an environmental model for the new state of the target environment as described throughout this disclosure. The environmental model may indicate what service information and/or configuration information would be for the target environment after deployment of the requested change.

The new threat model 712 may indicate one or more resources included within the target environment. The one or more resources included in the new threat model 712 may be the same one or more resources included in the current threat model 702 in some instances. In other instances, the one or more resources included in the new threat model 712 may additionally include resources that would be added to the target environment by the change or omit resources that would be removed from the target environment by the change. In the illustrated embodiment, the resources include a first resource 714 (shown as resource 'a1') and a second resource 718 (shown as resource 'S1'). In the illustrated embodiment, the first resource 714 may be the same resource as the first resource 704 and the second resource 718 may be the same resource as the second resource 708.

The new threat model 712 may indicate risks that can be presented by the resources and/or security settings of the resources (which collectively is referred to as 'risks' herein) at the new state of the target environment. In particular, the new threat model 712 may include risks for each of the corresponding resources included in the new threat model 712 with the target environment at the new state. In the illustrated embodiment, the new threat model 712 includes a first risk 716 corresponding to the first resource 714 and a second risk 720 corresponding to the second resource 718. The first risk 716 indicates that the first resource 714 has public access at the new state in the illustrated embodiment. The second risk 720 indicates that the second resource 718 has private access at the new state in the illustrated embodiment.

The threat models 700 may include a threat change model 722. The threat change model 722 may indicate security changes from the current state of the target environment to the new state of the target environment. The threat analysis system may produce the threat change model 722 by comparing the risks within the current threat model 702 and the new threat model 712. For example, the threat analysis system may compare a risk for a resource within the current threat model 702 to determine whether there is a security change for the resource between the current state of the target environment and the new state of the target environment. For resources added or removed by the change, a resource in one of the threat models may not have a corresponding resource in the other threat model. In this instance, the threat analysis system may determine that the lack of the corresponding resource is a security change and may determine that the security change is the added risk or the removed risk for the corresponding resource included in the new state or omitted in the new state, respectively.

The threat change model 722 may separate the security changes into introduced risks 732 and/or mitigated risks 734 in some embodiments. The introduced risks 732 may be additional risks presented in the new state of the target environment that were not presented in the current state of the target environment. The mitigated risks 734 may be risks that were presented in the current state of the target environment that will not be presented in the new state. The introduced risks 732 and the mitigated risks 734 may be associated with the corresponding resource at which the risk is introduced and/or mitigated.

The threat change model 722 may indicate resources of the target environment. The resources included in the threat change model 722 may be resources corresponding to security changes identified by the threat analysis system. The threat change model 722 includes a first resource 724 and a second resource 728 in the illustrated embodiment. The first resource 724 may be the same resource as the first resource 704 and the first resource 714. The second resource 728 may be the same resource as the second resource 708 and the second resource 718.

The threat change model 722 may indicate introduced risks 732 and/or mitigated risks 734 for the resources. The threat analysis system may determine the introduced risks 732 and/or the mitigated risks 734 based on a comparison of the current threat model 702 and the new threat model 712. In the illustrated embodiment, an introduced risk 726 corresponding to the first resource 724 is included. The introduced risk 726 may indicate that there was an introduced risk for the possibility of access of public entities to the first resource 724. The threat analysis system may identify the introduced risk 726 based on the first risk 706 corresponding to the first resource 704 in the current threat model 702 being private access and changing to the first risk 716 corresponding to the first resource 714 in the new threat model 712 being public access. In the illustrated embodiment, a mitigated risk 730 corresponding to the second resource 728 is included. The mitigated risk 730 may indicate that there was a mitigated risk of limiting possible access to private entities for the second resource 728. The threat analysis system may identify the mitigated risk 730 based on the second risk 710 corresponding to the second resource 708 in the current threat model 702 being public access and changing to the second risk 720 corresponding to the second resource 718 in the new threat model 712 being private access.

The threat analysis system may determine an action to be performed based at least in part on the threat change model 722. For example, the threat analysis system may apply model difference rules to the risks indicated in the threat change model 722. The threat analysis system may compare the introduced risk 726 corresponding to the first resource 724 and the mitigated risk 730 corresponding to the second resource 728 to the rules within the model difference rules to determine an action to be performed by the threat analysis system. In some embodiments, applying the model difference rules of 606 (FIG. 6) may include applying the model difference rules to a threat change model, such as the threat change model 722.

Figure 8:
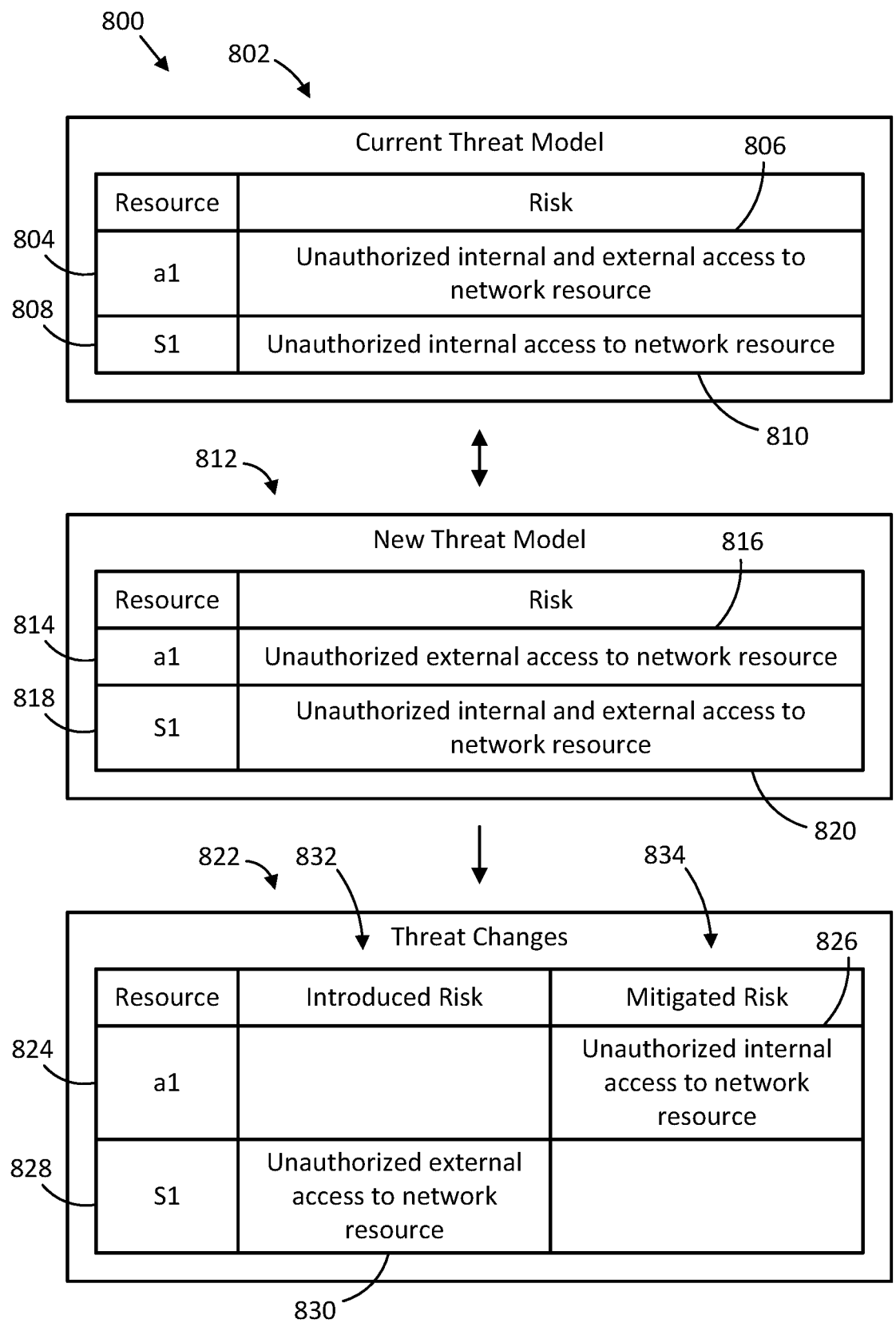
FIG. 8 illustrates example threat models that may be utilized for threat analysis in accordance with some embodiments.

FIG. 8 illustrates example threat models 800 that may be utilized for threat analysis in accordance with some embodiments. For example, the threat models 800 include threat models for different states of a target environment and threat change models indicating the threat changes between the different states. The threat models 800 may be generated and/or utilized by a threat analysis system (such as the threat analysis system 112 (FIG. 1) and/or the threat analysis system 216 (FIG. 2)) and/or a threat change analysis subsystem (such as the threat change analysis subsystem 322 (FIG. 3)). For brevity, the threat models 800 are described as being generated and/or utilized by a threat analysis system herein, although it should be understood that the threat models 800 may be generated and/or utilized by a threat change analysis subsystem in other embodiments.

The threat models 800 include a current threat model 802. The current threat model 802 may be for a current state of the target environment, where the current state of the target environment is prior to deployment of a requested change to the target environment. The current threat model 802 may be generated by the threat analysis system based on an environmental model for the current state of the target environment as described throughout this disclosure.

The current threat model 802 may indicate one or more resources included within the target environment. The resources may include physical resources (such as subnets, networks, processors, memory devices, network devices, and/or other physical computer resources) and/or constructs (such as an account, a virtual cloud network (VCN), an instance, and/or other computer constructs). In the illustrated embodiment, the resources include a first resource 804 (shown as resource 'a1') and a second resource 808 (shown as resource 'S1'). In some embodiments, the resources included in the current threat model 802 may be limited to resources that can present security risks.

The current threat model 802 may indicate risks that can be presented by the resources and/or security settings of the resources (which collectively is referred to as 'risks' herein) at the current state of the target environment. In particular, the current threat model 802 may include risks for each of the corresponding resources included in the current threat model 802 with the target environment at the current state. In the illustrated embodiment, the current threat model 802 includes a first risk 806 corresponding to the first resource 804 and a second risk 810 corresponding to the second resource 808. The first risk 806 indicates that the first resource 804 has the risk of unauthorized internal and external access to the network resource at the current state in the illustrated embodiment. The second risk 810 indicates that the second resource 808 has the risk of unauthorized internal access to the network resource at the current state in the illustrated embodiment.

The threat models 800 include a new threat model 812. The new threat model 812 may be for a new state of the target environment, where the new state of the target environment is after deployment of a requested change to the target environment. The new threat model 812 may be generated by the threat analysis system based on an environmental model for the new state of the target environment as described throughout this disclosure. The environmental model may indicate what service information and/or configuration information would be for the target environment after deployment of the requested change.

The new threat model 812 may indicate one or more resources included within the target environment. The one or more resources included in the new threat model 812 may be the same one or more resources included in the current threat model 802 in some instances. In other instances, the one or more resources included in the new threat model 812 may additionally include resources that would be added to the target environment by the change or omit resources that would be removed from the target environment by the change. In the illustrated embodiment, the resources include a first resource 814 (shown as resource 'a1') and a second resource 818 (shown as resource 'S1'). In the illustrated embodiment, the first resource 814 may be the same resource as the first resource 804 and the second resource 818 may be the same resource as the second resource 808.

The new threat model 812 may indicate risks that can be presented by the resources and/or security settings of the resources (which collectively is referred to as 'risks' herein) at the new state of the target environment. In particular, the new threat model 812 may include risks for each of the corresponding resources included in the new threat model 812 with the target environment at the new state. In the illustrated embodiment, the new threat model 812 includes a first risk 816 corresponding to the first resource 814 and a second risk 820 corresponding to the second resource 818. The first risk 816 indicates that the first resource 814 has the risk of unauthorized external access to the network resource at the new state in the illustrated embodiment. The second risk 820 indicates that the second resource 818 has the risk of unauthorized internal and external access to the network resource at the new state in the illustrated embodiment.

The threat models 800 may include a threat change model 822. The threat change model 822 may indicate security changes from the current state of the target environment to the new state of the target environment. The threat analysis system may produce the threat change model 822 by comparing the risks within the current threat model 802 and the new threat model 812. For example, the threat analysis system may compare a risk for a resource within the current threat model 802 to determine whether there is a security change for the resource between the current state of the target environment and the new state of the target environment. For resources added or removed by the change, a resource in one of the threat models may not have a corresponding resource in the other threat model. In this instance, the threat analysis system may determine that the lack of the corresponding resource is a security change and may determine that the security change is the added risk or the removed risk for the corresponding resource included in the new state or omitted in the new state, respectively.

The threat change model 822 may separate the security changes into introduced risks 832 and/or mitigated risks 834 in some embodiments. The introduced risks 832 may be additional risks presented in the new state of the target environment that were not presented in the current state of the target environment. The mitigated risks 834 may be risks that were presented in the current state of the target environment that will not be presented in the new state. The introduced risks 832 and the mitigated risks 834 may be associated with the corresponding resource at which the risk is introduced and/or mitigated.

The threat change model 822 may indicate resources of the target environment. The resources included in the threat change model 822 may be resources corresponding to security changes identified by the threat analysis system. The threat change model 822 includes a first resource 824 and a second resource 828 in the illustrated embodiment. The first resource 824 may be the same resource as the first resource 804 and the first resource 814. The second resource 828 may be the same resource as the second resource 808 and the second resource 818.

The threat change model 822 may indicate introduced risks 832 and/or mitigated risks 834 for the resources. The threat analysis system may determine the introduced risks 832 and/or the mitigated risks 834 based on a comparison of the current threat model 802 and the new threat model 812. In the illustrated embodiment, a mitigated risk 826 corresponding to the first resource 824 is included. The mitigated risk 826 may indicate that there was a mitigated risk for unauthorized internal access to the first resource 824. The threat analysis system may identify the mitigated risk 826 based on the first risk 806 corresponding to the first resource 804 in the current threat model 802 being presenting the risk of unauthorized internal and external access and changing to the first risk 816 corresponding to the first resource 814 in the new threat model 812 being presenting the risk of unauthorized external access. In the illustrated embodiment, an introduced risk 830 corresponding to the second resource 828 is included. The introduced risk 830 may indicate that there was an introduced risk of unauthorized external access for the second resource 828. The threat analysis system may identify the introduced risk 830 based on the second risk 810 corresponding to the second resource 808 in the current threat model 802 being presenting a risk of unauthorized internal access and changing to the second risk 820 corresponding to the second resource 818 in the new threat model 812 being presenting a risk of unauthorized internal and external access.

The threat analysis system may determine an action to be performed based at least in part on the threat change model 822. For example, the threat analysis system may apply model difference rules to the risks indicated in the threat change model 822. The threat analysis system may compare the mitigated risk 826 corresponding to the first resource 824 and the introduced risk 830 corresponding to the second resource 828 to the rules within the model difference rules to determine an action to be performed by the threat analysis system. In some embodiments, applying the model difference rules of 606 (FIG. 6) may include applying the model difference rules to a threat change model, such as the threat change model 822.

The threat analysis approaches described herein may effectively identify security threat changes that are caused by a requested change to an infrastructure environment. For example, the threat analysis systems and/or the threat change analysis subsystem described herein may intercept a requested change and determine the risks introduced and/or mitigated by the requested change. The threat analysis systems and/or the threat change analysis subsystem may determine an action to be performed related to the requested change based at least in part on the introduced and/or mitigated by the requested change. In some embodiments, the threat analysis systems and/or the threat change analysis subsystem may further determine the action to be performed based at least in part on the risks that would be presented by the infrastructure environment after the requested change is deployed to the infrastructure environment.

As infrastructure environments have become more complex and the ability to deploy changes to infrastructure environments at higher speeds have presented many challenges. The systems and the subsystems described herein may address at least some of those challenges. For example, the speed at which systems and subsystems may perform the threat analysis and produce decision on an action to be performed may reduce or mitigate any delay that may be presented by legacy threat analysis approaches. This may allow infrastructure environment changes to be deployed quicker than in legacy approaches which can be beneficial including in highly reactive environments. The reliability of the threat analysis performed by the systems and subsystems may be beneficial in identifying security risk changes that are caused by the change to the infrastructure environment. The systems and subsystems may identify security risk changes that may be missed by legacy approaches. Identifying all the security risk changes may allow for making a better decision of whether to allow or reject the requested change.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
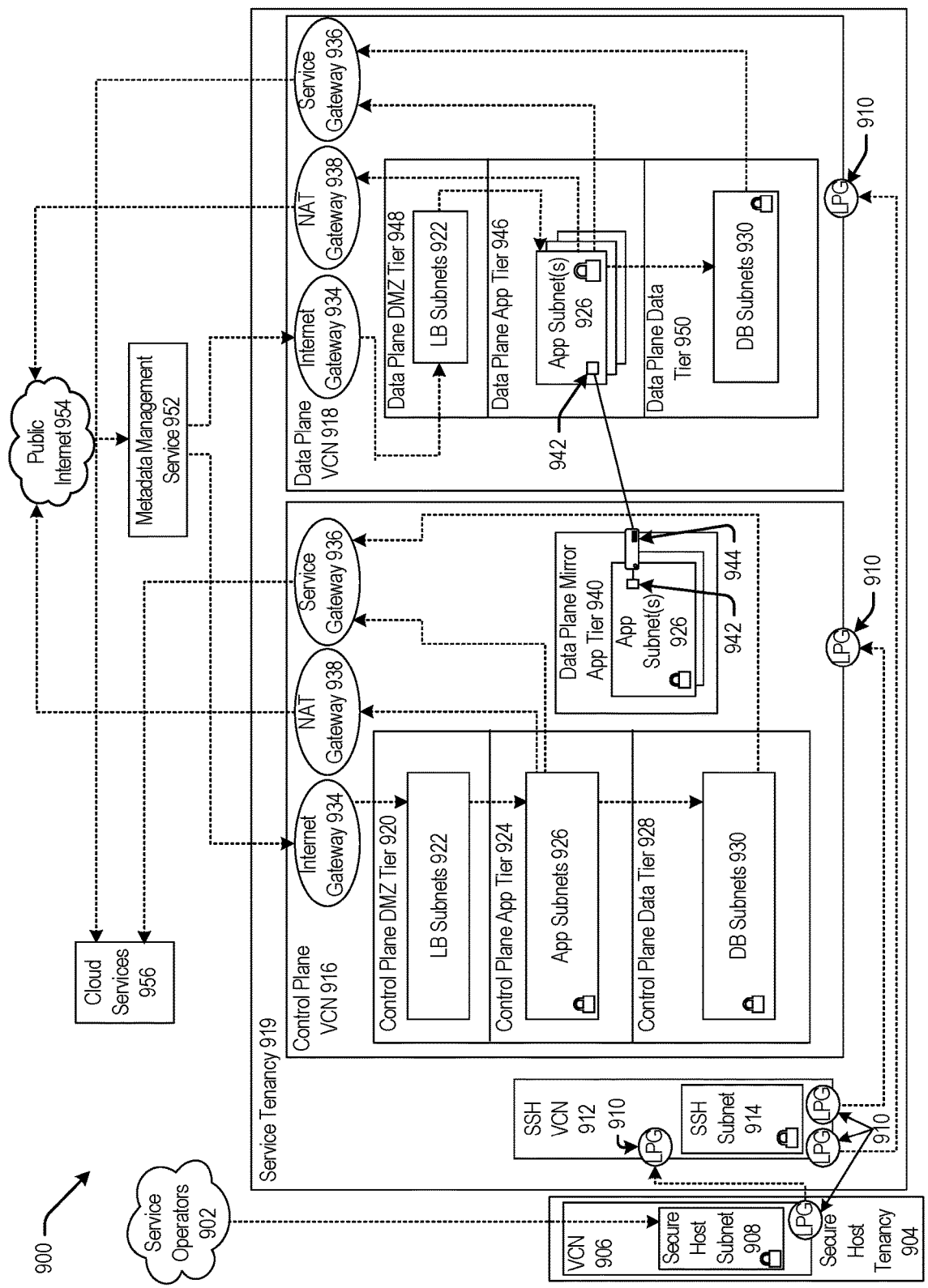
FIG. 9 is a block diagram illustrating an example pattern of an IaaS architecture, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
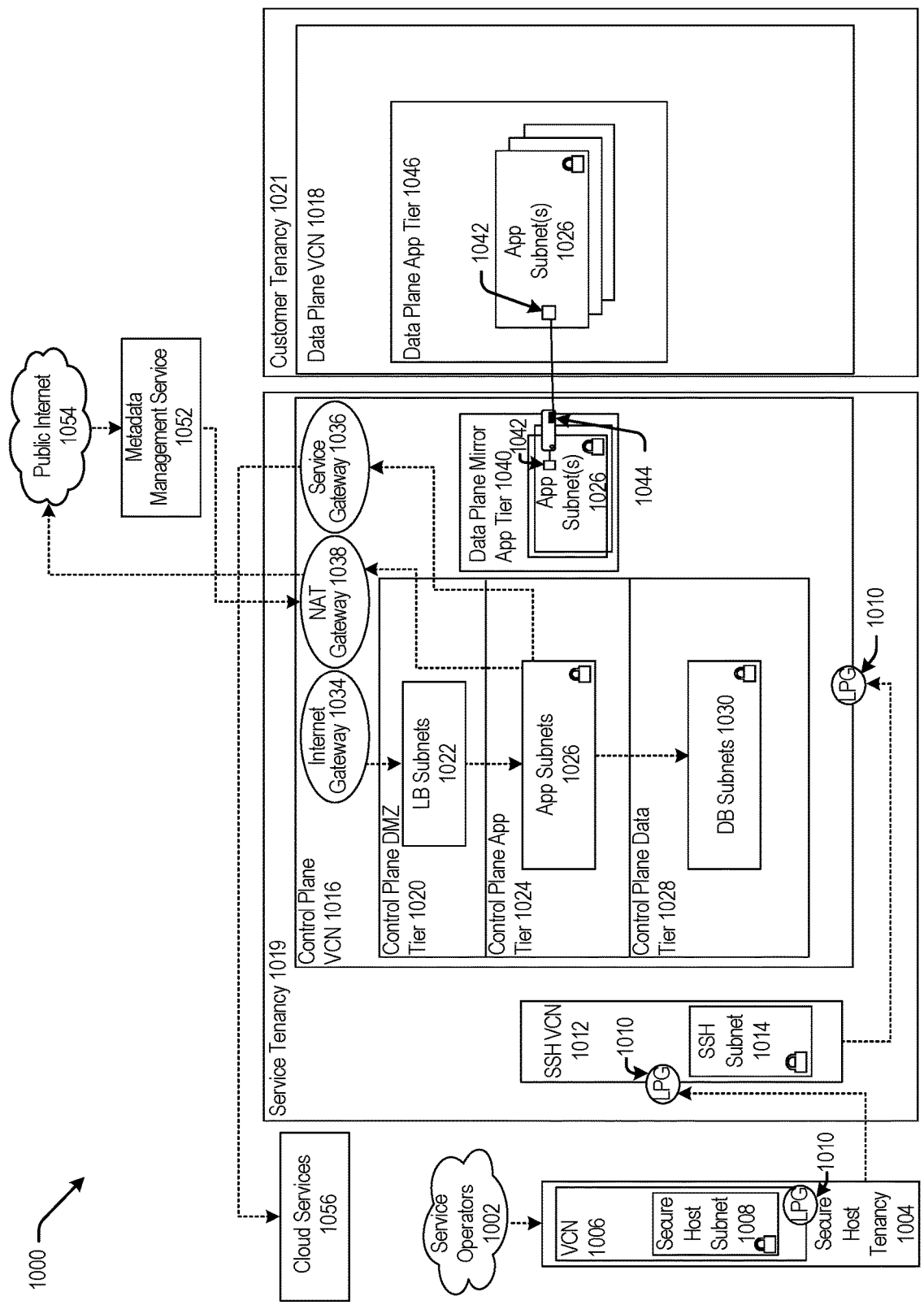
FIG. 10 is a block diagram illustrating another example pattern of an IaaS architecture, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
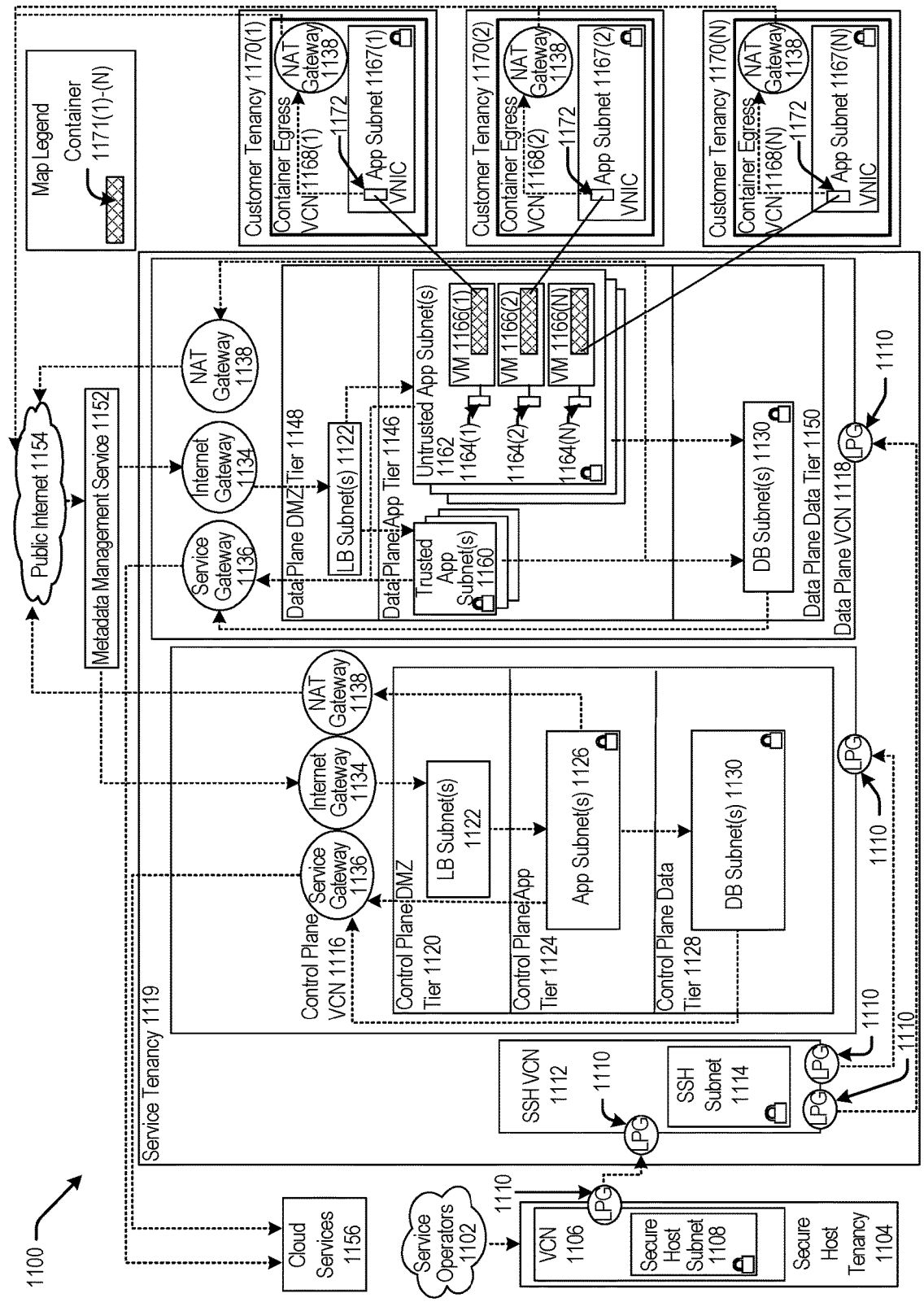
FIG. 11 is a block diagram illustrating another example pattern of an IaaS architecture, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
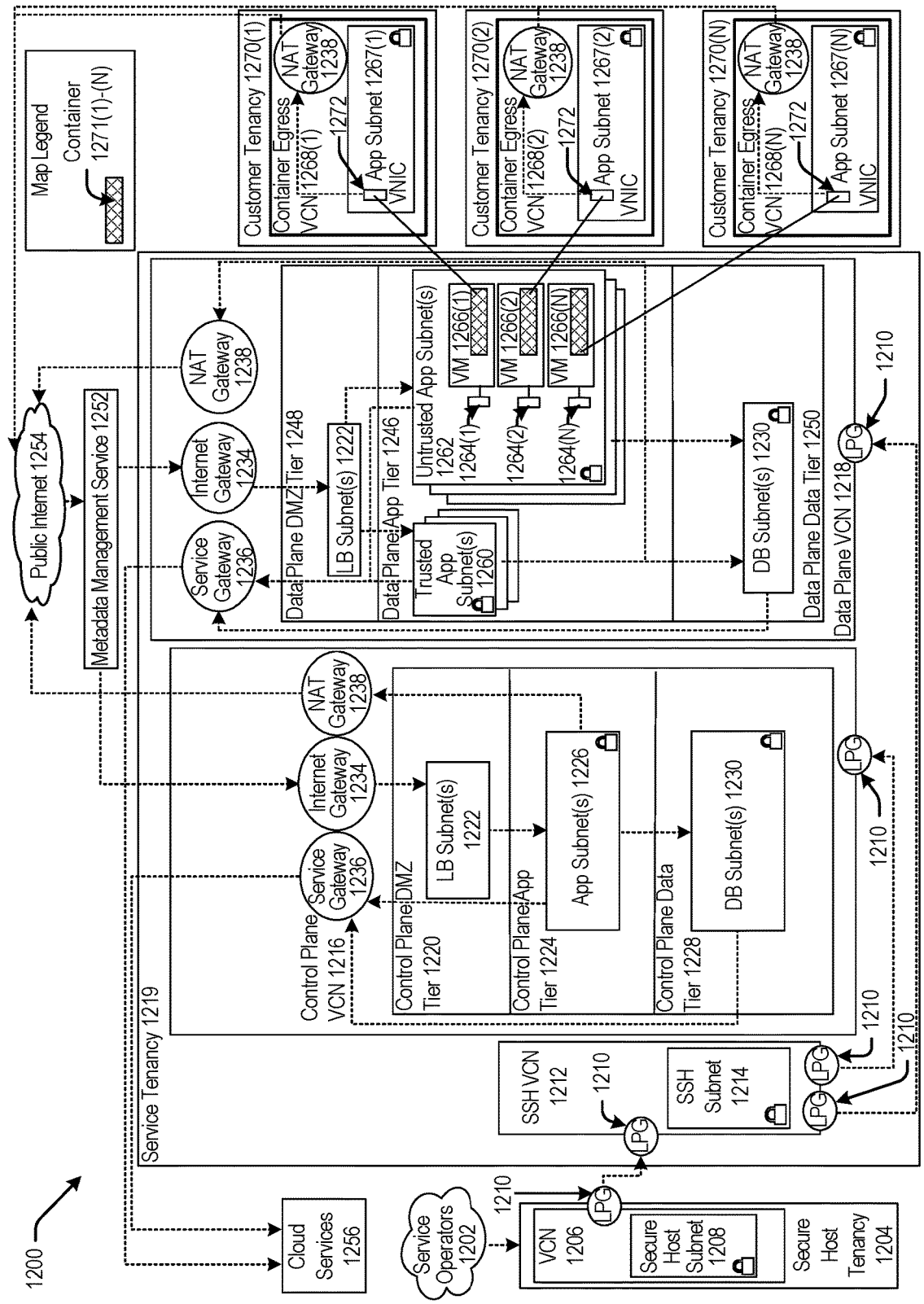
FIG. 12 is a block diagram illustrating another example pattern of an IaaS architecture, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
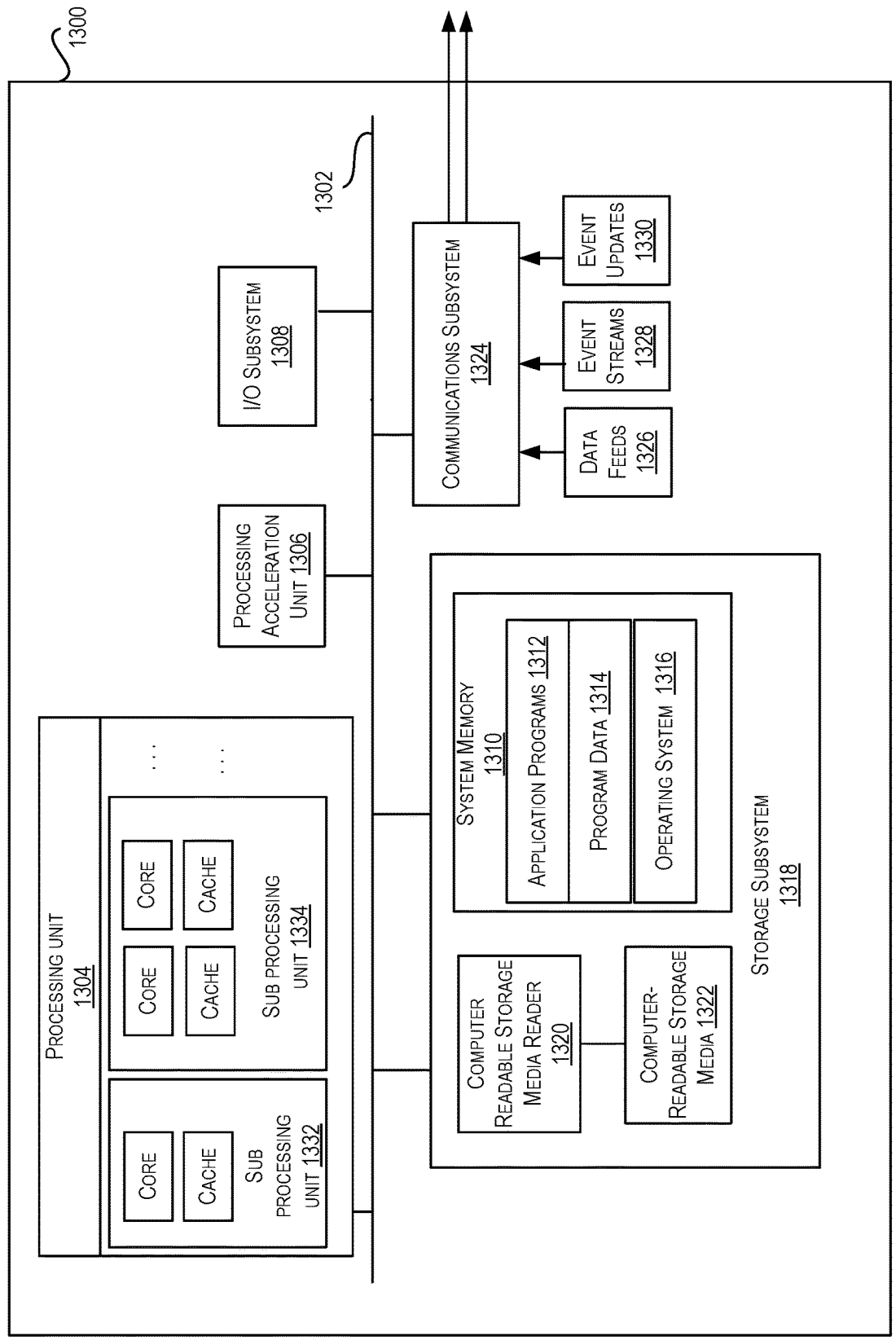
FIG. 13 illustrates an example computer system, in which various embodiments may be implemented.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

Examples

In the following sections, further exemplary embodiments are provided.

Example 1 may include one or more non-transitory, computer-readable media having instructions stored thereon, wherein the instructions, when executed by a system, cause the system to perform processing comprising receiving a change to be applied to an infrastructure environment for supporting a set of services, generating a change threat model for the infrastructure environment based upon the change to be applied, the change threat model indicative of a new security state for the infrastructure environment upon applying the change, comparing the change threat model with a current threat model for an existing state of the infrastructure environment, the current threat model indicative of a current security state for the existing state of the infrastructure environment, identifying a security change in a security state of the infrastructure environment based at least in part on the comparison, and responsive to identifying the security change in the security state, determining whether an action is to be performed with respect to the security change.

Example 2 may include the one or more non-transitory, computer-readable media of example 1, wherein generating the change threat model includes determining a resource corresponding to the change, and determining a threat corresponding to the resource based at least in part on the change, wherein the change threat model indicates the threat for the resource.

Example 3 may include the one or more non-transitory, computer-readable media of example 1, wherein the processing further comprises determining that the current threat model had not been previously produced, and generating the current threat model based at least in part on the determination that the current threat model had not been previously produced.

Example 4 may include the one or more non-transitory, computer-readable media of example 1, wherein identifying the security change comprises determining a resource corresponding to the change, and determining a difference between first security threats for the resource within the change threat model and second security threats for the resource within the current threat model, wherein the security change comprises the difference.

Example 5 may include the one or more non-transitory, computer-readable media of example 1, wherein determining whether the action is to be performed includes determining whether the security change is of a type for which an indication is to be provided, and wherein the processing further comprises providing the indication based at least in part on the security change being of the type.

Example 6 may include the one or more non-transitory, computer-readable media of example 1, wherein determining whether the action is to be performed comprises determining to provide an indication of the security change, and wherein the processing further comprises providing the indication of the security change to a source of a request for the change.

Example 7 may include the one or more non-transitory, computer-readable media of example 1, wherein determining whether the action is to be performed comprises determining, based on the security change, that a query is to presented to determine whether the change is to be allowed, presenting the query, and determining whether to implement the change based on a response to the query.

Example 8 may include the one or more non-transitory, computer-readable media of example 1, wherein determining whether the action is to be performed comprises determining, based on the security change, to provide the change to another system for further processing to determine whether to implement the change with the infrastructure environment.

Example 9 may include the one or more non-transitory, computer-readable media of example 1, wherein the processing further comprises retrieving full model rules related to threat models, and applying the full model rules to the change threat model, wherein determine whether the action is to be performed is based at least in part on the full model rules being applied to the change threat model.

Example 10 may include the one or more non-transitory, computer-readable media of example 1, wherein determining whether the action is to be performed comprises determining a region in which the infrastructure environment is located, determining rules corresponding to the region, and applying the rules to the security change to determine whether the action is to be performed.

Example 11 may include the one or more non-transitory, computer-readable media of example 1, wherein the processing further comprises completing the change with the infrastructure environment.

Example 12 may include the one or more non-transitory, computer-readable media of example 11, wherein the processing further comprises determining that the security change is an approved type of security change, and completing the change based at least in part on the determination that the security change is the approved type of security change.

Example 13 may include the one or more non-transitory, computer-readable media of example 1, wherein the processing further comprises retrieving acceptance criteria related to the security change, wherein determining whether the action is to be performed with respect to the security change comprises determining whether the security change is acceptable based on the acceptance criteria.

Example 14 may include the one or more non-transitory, computer-readable media of example 1, wherein the system is coupled to source control system related to the infrastructure environment.

Example 15 may include the one or more non-transitory, computer-readable media of example 1, wherein the system is coupled to a deployment system related to the infrastructure environment.

Example 16 may include a method, comprising receiving, by a system, a change to be applied to an infrastructure environment for supporting a set of services, generating, by the system, a change threat model for the infrastructure environment based upon the change to be applied, the change threat model indicative of a new security state for the infrastructure environment upon applying the change, comparing, by the system, the change threat model with a current threat model for an existing state of the infrastructure environment, the current threat model indicative of a current security state for the existing state of the infrastructure environment, identifying, by the system, a security change in a security state of the infrastructure environment based at least in part on the comparison, and responsive to identifying the security change in the security state, determining, by the system, whether an action is to be performed with respect to the security change.

Example 17 may include the method of example 16, wherein determining whether the action is to be performed includes determining whether the security change is of a type for which an indication is to be provided, and wherein the method further comprises providing the indication based at least in part on the security change being of the type.

Example 18 may include the method of example 16, further comprising determining, by the system, that the security change is an approved type of security change, and completing, by the system, the change based at least in part on the determination that the security change is the approved type of security change.

Example 19 may include a threat analysis system, comprising a memory to store a current threat model for an existing state of an infrastructure environment, and a processor coupled to the memory, the processor to receive a change to be applied to the infrastructure environment for supporting a set of services, generate a change threat model for the infrastructure environment based upon the change to be applied, the change threat model indicative of a new security state for the infrastructure environment upon applying the change, compare the change threat model with the current threat model for the existing state of the infrastructure environment, the current threat model indicative of a current security state for the existing state of the infrastructure environment, identify a security change in a security state of the infrastructure environment based at least in part on the comparison, and responsive to identification of the security change in the security state, determine whether an action is to be performed with respect to the security change.

Example 20 may include the threat analysis system of example 19, wherein to identify the security change comprises to determine a resource corresponding to the change, and determine a difference between first security threats for the resource within the change threat model and second security threats for the resource within the current threat model, wherein the security change comprises the difference.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory, computer-readable media having instructions stored thereon, wherein the instructions, when executed by a system, cause the system to perform processing comprising:
   receiving a change to be applied to an infrastructure environment for supporting a set of services;
   generating a change threat model for the infrastructure environment based upon the change to be applied, the change threat model indicative of a new security state for the infrastructure environment upon applying the change;
   comparing the change threat model with a current threat model for an existing state of the infrastructure environment, the current threat model indicative of a current security state for the existing state of the infrastructure environment;

identifying a security change in a security state of the infrastructure environment based at least in part on the comparison;

applying model difference rules to the security change to determine a first action;

applying full model rules to the change threat model to determine a second action; and determining whether to perform an action from the first action or the second action with respect to the change.

2. The one or more non-transitory, computer-readable media of claim 1, wherein generating the change threat model includes:

determining a resource corresponding to the change; and determining a threat corresponding to the resource based at least in part on the change, wherein the change threat model indicates the threat for the resource.

3. The one or more non-transitory, computer-readable media of claim 1, wherein the processing further comprises:

determining that the current threat model had not been previously produced; and generating the current threat model based at least in part on the determination that the current threat model had not been previously produced.

4. The one or more non-transitory, computer-readable media of claim 1, wherein identifying the security change comprises:

determining a resource corresponding to the change; and determining a difference between first security threats for the resource within the change threat model and second security threats for the resource within the current threat model, wherein the security change comprises the difference.

5. The one or more non-transitory, computer-readable media of claim 1, wherein determining whether the action is to be performed includes determining whether the security change is of a type for which an indication is to be provided, and wherein the processing further comprises providing the indication based at least in part on the security change being of the type.

6. The one or more non-transitory, computer-readable media of claim 1, wherein determining whether the action is to be performed comprises determining to provide an indication of the security change, and wherein the processing further comprises providing the indication of the security change to a source of a request for the change.

7. The one or more non-transitory, computer-readable media of claim 1, wherein determining whether the action is to be performed comprises:

determining, based on the security change, that a query is to be presented to determine whether the change is to be allowed;

presenting the query; and determining whether to implement the change based on a response to the query.

8. The one or more non-transitory, computer-readable media of claim 1, wherein determining whether the action is to be performed comprises determining, based on the security change, to provide the change to another system for further processing to determine whether to implement the change with the infrastructure environment.

9. The one or more non-transitory, computer-readable media of claim 1, wherein determining whether the action is to be performed comprises:

determining a region in which the infrastructure environment is located;

determining the model difference rules corresponding to the region; and applying the model difference rules to the security change to determine whether the action is to be performed.

10. The one or more non-transitory, computer-readable media of claim 1, wherein the processing further comprises completing the change with the infrastructure environment.

11. The one or more non-transitory, computer-readable media of claim 10, wherein the processing further comprises:

determining that the security change is an approved type of security change; and completing the change based at least in part on the determination that the security change is the approved type of security change.

12. The one or more non-transitory, computer-readable media of claim 1, wherein the processing further comprises:

retrieving acceptance criteria related to the security change, wherein determining whether the action is to be performed with respect to the change comprises determining whether the security change is acceptable based on the acceptance criteria.

13. The one or more non-transitory, computer-readable media of claim 1, wherein the system is coupled to a source control system related to the infrastructure environment.

14. The one or more non-transitory, computer-readable media of claim 1, wherein the system is coupled to a deployment system related to the infrastructure environment.

15. The one or more non-transitory, computer-readable media of claim 1, wherein the processing further comprises:

determining a first rank corresponding to the first action;

determining a second rank corresponding to the second action; and determining the action from the first action or the second action based at least in part on the first rank and the second rank.

16. A method, comprising:

receiving, by a system, a change to be applied to an infrastructure environment for supporting a set of services;

generating, by the system, a change threat model for the infrastructure environment based upon the change to be applied, the change threat model indicative of a new security state for the infrastructure environment upon applying the change;

comparing, by the system, the change threat model with a current threat model for an existing state of the infrastructure environment, the current threat model indicative of a current security state for the existing state of the infrastructure environment;

identifying, by the system, a security change in a security state of the infrastructure environment based at least in part on the comparison;

applying model difference rules to the security change to determine a first action;

applying full model rules to the change threat model to determine a second action; and determining, by the system, whether to perform an action from the first action or the second action with respect to the change.

17. The method of claim 16, wherein determining whether the action is to be performed includes determining, whether the security change is of a type for which an indication is to be provided, and wherein the method further comprises providing the indication based at least in part on the security change being of the type.

18. The method of claim 16, further comprising:

determining, by the system, that the security change is an approved type of security change; and completing, by the system, the change based at least in part on the determination that the security change is the approved type of security change.

19. A threat analysis system, comprising:

a memory to store a current threat model for an existing state of an infrastructure environment; and a processor coupled to the memory, the processor to:

receive a change to be applied to the infrastructure environment for supporting a set of services;

generate a change threat model for the infrastructure environment based upon the change to be applied, the change threat model indicative of a new security state for the infrastructure environment upon applying the change;

compare the change threat model with the current threat model for the existing state of the infrastructure environment, the current threat model indicative of a current security state for the existing state of the infrastructure environment;

identify a security change in a security state of the infrastructure environment based at least in part on the comparison;

apply model difference rules to the security change to determine a first action;

apply full model rules to the change threat model to determine a second action; and determine whether to perform an action from the first action or the second action with respect to the change.

20. The threat analysis system of claim 19, wherein to identify the security change comprises to:

determine a resource corresponding to the change; and determine a difference between first security threats for the resource within the change threat model and second security threats for the resource within the current threat model, wherein the security change comprises the difference.

\* \* \* \* \*